United States Patent
Guo et al.

(10) Patent No.: US 12,520,346 B2
(45) Date of Patent: Jan. 6, 2026

(54) PHYSICAL UPLINK SHARED CHANNEL REPETITION HANDLING IN FRAME BASED EQUIPMENT MODE IDLE PERIOD

(71) Applicant: QUALCOMM Incorporated, San Diego, CA (US)

(72) Inventors: Shaozhen Guo, Beijing (CN); Xiaoxia Zhang, San Diego, CA (US); Changlong Xu, Beijing (CN); Jing Sun, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 18/003,057

(22) PCT Filed: Sep. 3, 2020

(86) PCT No.: PCT/CN2020/113212
§ 371 (c)(1),
(2) Date: Dec. 22, 2022

(87) PCT Pub. No.: WO2022/047694
PCT Pub. Date: Mar. 10, 2022

(65) Prior Publication Data
US 2023/0254896 A1      Aug. 10, 2023

(51) Int. Cl.
*H04W 74/0816*      (2024.01)
*H04W 74/04*      (2009.01)

(52) U.S. Cl.
CPC ....... *H04W 74/0816* (2013.01); *H04W 74/04* (2013.01)

(58) Field of Classification Search
CPC .......... H04W 74/0816; H04W 74/0808; H04L 5/0044
See application file for complete search history.

(56) References Cited

U.S. PATENT DOCUMENTS

| | | | |
|---|---|---|---|
| 9,345,047 B2 | 5/2016 | Damnjanovic et al. | |
| 10,674,467 B2 | 6/2020 | Luo et al. | |
| 2018/0352573 A1* | 12/2018 | Yang | H04W 16/14 |
| 2019/0335456 A1 | 10/2019 | Yerramalli et al. | |

(Continued)

FOREIGN PATENT DOCUMENTS

| CN | 105594284 A | 5/2016 |
|---|---|---|
| WO | 2015050771 | 4/2015 |
| WO | 2016032776 | 3/2016 |

OTHER PUBLICATIONS

KR 10-2020-0035906 Machine English Translation (Year: 2020).*
(Continued)

*Primary Examiner* — James P Duffy
(74) *Attorney, Agent, or Firm* — Harrity & Harrity, LLP

(57) ABSTRACT

Various aspects of the present disclosure generally relate to wireless communication. In some aspects, a user equipment (UE) may determine that a physical uplink shared channel (PUSCH) repetition overlaps with an idle period associated with a fixed frame period for communicating over an unlicensed channel in a frame based equipment mode. The UE may refrain from transmitting over the unlicensed channel during one or more symbols of the PUSCH repetition that coincide with the idle period. Numerous other aspects are provided.

30 Claims, 19 Drawing Sheets

522
Nominal Type B repetition crossing slot boundary is segmented into one or more actual PUSCH repetitions 524
Nominal Type B repetition conflicting with downlink or invalid symbols is segmented into one or more actual PUSCH repetitions

(56) References Cited

U.S. PATENT DOCUMENTS

| | | | |
|---|---|---|---|
| 2020/0037354 A1 | 1/2020 | Li et al. | |
| 2023/0156674 A1* | 5/2023 | Yao | H04W 72/0446 370/280 |
| 2023/0189338 A1* | 6/2023 | Singh | H04W 74/0816 370/329 |
| 2023/0354275 A1* | 11/2023 | Moon | H04W 74/0808 |

OTHER PUBLICATIONS

Foreign Priority document for Moon et al., KR 10-2020-0035906 (Year: 2020).*
Supplementary European Search Report—EP20951941—Search Authority—The Hague—Apr. 18, 2024.
ETRI: "Discussion on Enhancements for URLLC in Unlicensed Bands", 3GPP TSG RAN WG1 #102-e, R1-2006356, e-Meeting, Aug. 17-28, 2020, Sections 1, 2.4, pp. 1-5.
Huawei, et al., "Uplink Enhancements for URLLC in Unlicensed Controlled Environments", 3GPP TSG RAN WG1 Meeting #102-e, R1-2006929, E-meeting, Aug. 17-28, 2020, the Whole Document, 6 Pages.
International Search Report and Written Opinion—PCT/CN2020/113212—ISA/EPO—Jun. 2, 2021.
Nokia, et al., "On UL Enhancements for IIoT/URLLC in Unlicensed Controlled Environment", 3GPP TSG RAN WG1 Meeting #102-e, R1-2006247, e-Meeting, Aug. 17-28, 2020, the Whole Document, 4 Pages.
Qualcomm Incorporated: "Uplink Enhancements for URLLC in Unlicensed Controlled Environments", 3GPP Draft, R1-2006801, 3GPP TSG-RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051918251, 7 Pages, paragraph [0002], Section 2, Figure 2-3-1, the whole document.
Sony: "Enhancements for Unlicensed Band URLLC/IIoT", 3GPP TSG RAN WG1 Meeting #102-e, R1-2005571, e-Meeting, Aug. 17-28, 2020, the Whole Document, 6 Pages.
ZTE: "Discussion on Unlicensed Band URLLC/IIoT", 3GPP TSG RAN WG1 Meeting #102-e, R1-2005433, e-Meeting, Aug. 17-28, 2020, the Whole Document, pp. 1-5.
ETRI: "Discussion on Enhancements for URLLC in Unlicensed Bands", 3GPP TSG RAN WG1 #102-e, R1-2006356, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020, pp. 1-5, Aug. 8, 2020, XP051915326.
Nokia, et al., "On UL Enhancements for IIoT/URLLC in Unlicensed Controlled Environment", 3GPP TSG RAN WG1 Meeting #102-e, R1-2006247, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020, 4 Pages, Aug. 8, 2020, XP051915276.

* cited by examiner

PHYSICAL UPLINK SHARED CHANNEL REPETITION HANDLING IN FRAME BASED EQUIPMENT MODE IDLE PERIOD

CROSS-REFERENCE TO RELATED APPLICATION

This application is a 371 national stage of PCT Application No. PCT/CN2020/113212 filed on Sep. 3, 2020, entitled "PHYSICAL UPLINK SHARED CHANNEL REPETITION HANDLING IN FRAME BASED EQUIPMENT MODE IDLE PERIOD," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for physical uplink shared channel (PUSCH) repetition handling in frame based equipment (FBE) mode idle period.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining that a physical uplink shared channel (PUSCH) repetition overlaps with an idle period associated with a fixed frame period (FFP) for communicating over an unlicensed channel in a frame based equipment (FBE) mode; and refraining from transmitting over the unlicensed channel during one or more symbols of the PUSCH repetition that coincide with the idle period.

In some aspects, a UE for wireless communication includes a memory and one or more processors operatively coupled to the memory, the memory and the one or more processors configured to: determine that a PUSCH repetition overlaps with an idle period associated with an FFP for communicating over an unlicensed channel in an FBE mode; and refrain from transmitting over the unlicensed channel during one or more symbols of the PUSCH repetition that coincide with the idle period.

In some aspects, a non-transitory computer-readable medium storing a set of instructions for wireless communication includes one or more instructions that, when executed by one or more processors of a UE, cause the UE to: determine that a PUSCH repetition overlaps with an idle period associated with an FFP for communicating over an unlicensed channel in an FBE mode; and refrain from transmitting over the unlicensed channel during one or more symbols of the PUSCH repetition that coincide with the idle period.

In some aspects, an apparatus for wireless communication includes means for determining that a PUSCH repetition overlaps with an idle period associated with an FFP for communicating over an unlicensed channel in an FBE mode; and means for refraining from transmitting over the unlicensed channel during one or more symbols of the PUSCH repetition that coincide with the idle period.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
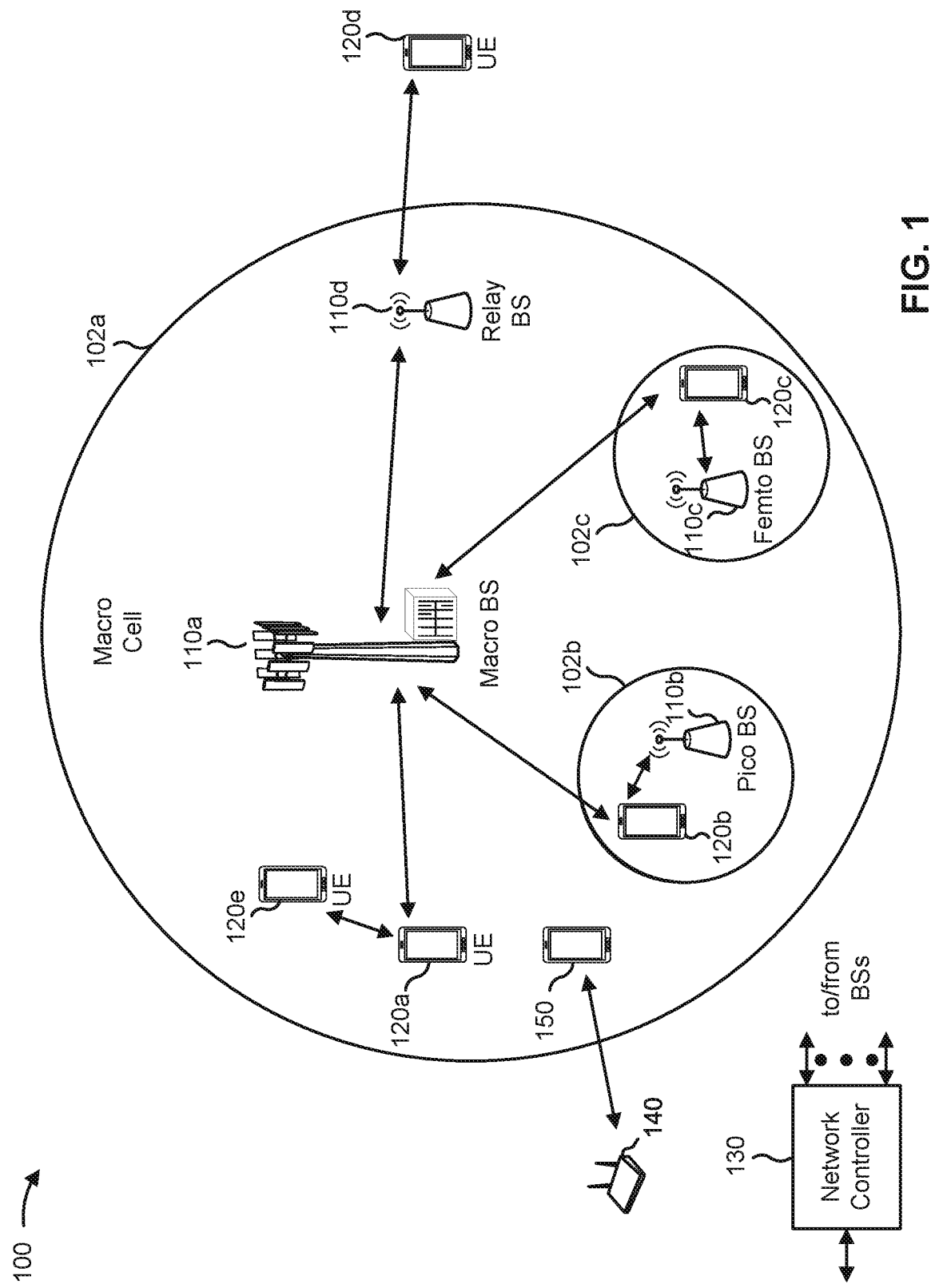
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Additionally, or alternatively, the wireless network 100 may include one or more wireless local area network (WLAN) access points 140 and one or more WLAN stations 150. The WLAN access points 140 may wirelessly communicate with the WLAN stations 150 via one or more WLAN access point antennas, over one or more communication links. In some aspects, a WLAN access point 140 may communicate with a WLAN station 150 using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac). In some aspects, a WLAN access point 140 and a base station 110 may be the same device or may be co-located. Additionally, or alternatively, a WLAN station 150 and a UE 120 may be the same device or may be co-located.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, devices of wireless network 100 may communicate with one another using a licensed radio frequency spectrum band and/or an unlicensed radio frequency spectrum band. For example, a base station 110 and a UE 120 may communicate using a RAT such as Licensed-Assisted Access (LAA), Enhanced LAA (eLAA), Further Enhanced LAA (feLAA), NR-Unlicensed (NR-U), and/or the like. In some aspects, a WLAN access point 140 and WLAN station 150 may communicate with one another using only the unlicensed radio frequency spectrum band (and not the licensed radio frequency spectrum band). The unlicensed radio frequency spectrum band may therefore be shared by the base stations 110, the UEs 120, the WLAN access points 140, the WLAN stations 150, and/or the like. Because the unlicensed radio frequency spectrum band may be shared by devices operating under different protocols (e.g., different RATs), transmitting devices may need to contend for access to the unlicensed radio frequency spectrum band prior to transmitting.

For example, in a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as a listen-before-talk (or listen-before-transmit) (LBT) procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as another UE, an IoT device, or a WLAN device, among other examples). The channel access procedure may include sensing or measuring the physical channel (e.g., performing a reference signal received power (RSRP) measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (e.g., based at least in part on whether the measurement satisfies a threshold). If the transmitting device determines that the channel access procedure was successful, the transmitting device may perform one or more transmissions on the shared or unlicensed channel during a transmission opportunity (TXOP), which may extend for a channel occupancy time (COT).

As indicated above, FIG. 1 is provided as an example. Other examples may differ from what is described with regard to FIG. 1.

Figure 2:
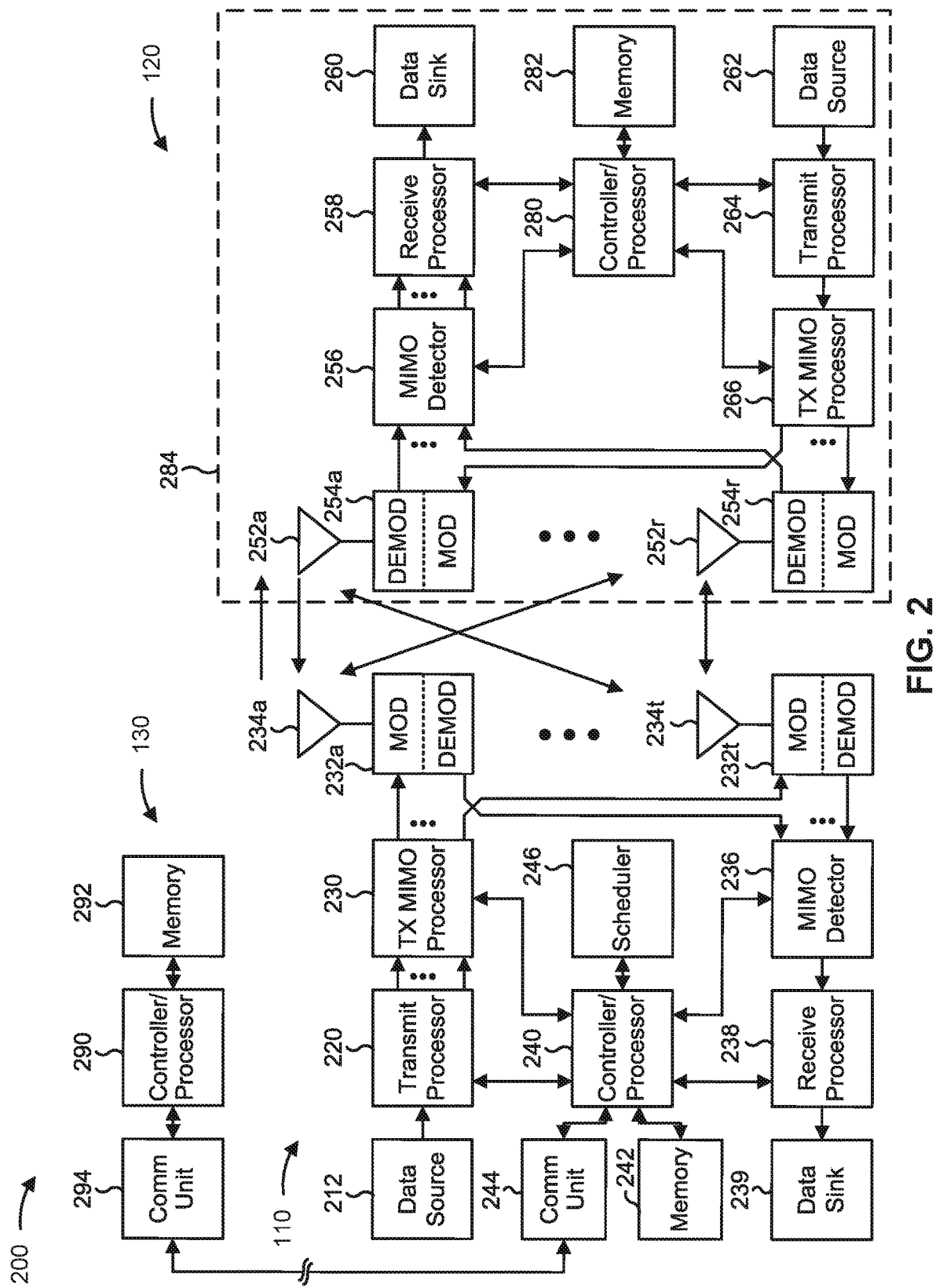
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIG. 6, FIG. 7, FIGS. 8A-8D, FIGS. 9A-9D, and/or FIG. 10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIG. 6, FIG. 7, FIGS. 8A-8D, FIGS. 9A-9D, and/or FIG. 10.

Controller/processor 240 of base station 110, controller/processor 280 of UE 120, and/or any other component(s) of FIG. 2 may perform one or more techniques associated with physical uplink shared channel (PUSCH) repetition handling in a frame based equipment (FBE) mode idle period, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1000 of FIG. 10 and/or other processes as described herein. In some aspects, executing instructions may include running the instructions, converting the instructions, compiling the instructions, interpreting the instructions, and/or the like.

In some aspects, the UE 120 includes means for determining that a PUSCH repetition overlaps with an idle period associated with a fixed frame period (FFP) for communicating over an unlicensed channel in an FBE mode; and/or means for refraining from transmitting over the unlicensed channel during one or more symbols of the PUSCH repetition that coincide with the idle period. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for refraining from transmitting over the unlicensed channel during one or more symbols of the PUSCH repetition that are outside the idle period, based at least in part on determining that the PUSCH repetition is associated with a type A configuration.

In some aspects, the UE includes means for segmenting the PUSCH repetition into multiple actual repetitions, wherein the PUSCH repetition is segmented around the idle period based at least in part on determining that the PUSCH repetition is associated with a type B configuration; and/or means for transmitting one or more of the multiple actual repetitions that do not overlap with the idle period.

In some aspects, the UE includes means for refraining from transmitting one or more of the multiple actual repetitions that are outside the idle period and occupy a single symbol.

In some aspects, the UE includes means for transmitting, in a next FFP, a PUSCH repetition that does not overlap with the idle period based at least in part on detecting downlink activity in a channel occupancy time associated with the next FFP.

In some aspects, the UE includes means for performing a listen-before-talk procedure in an interval before the PUSCH repetition that does not overlap with the idle period, based at least in part on a gap between an uplink and downlink transmission burst satisfying a threshold.

In some aspects, the UE includes means for refraining from transmitting one or more PUSCH repetitions that are scheduled in a next FFP.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
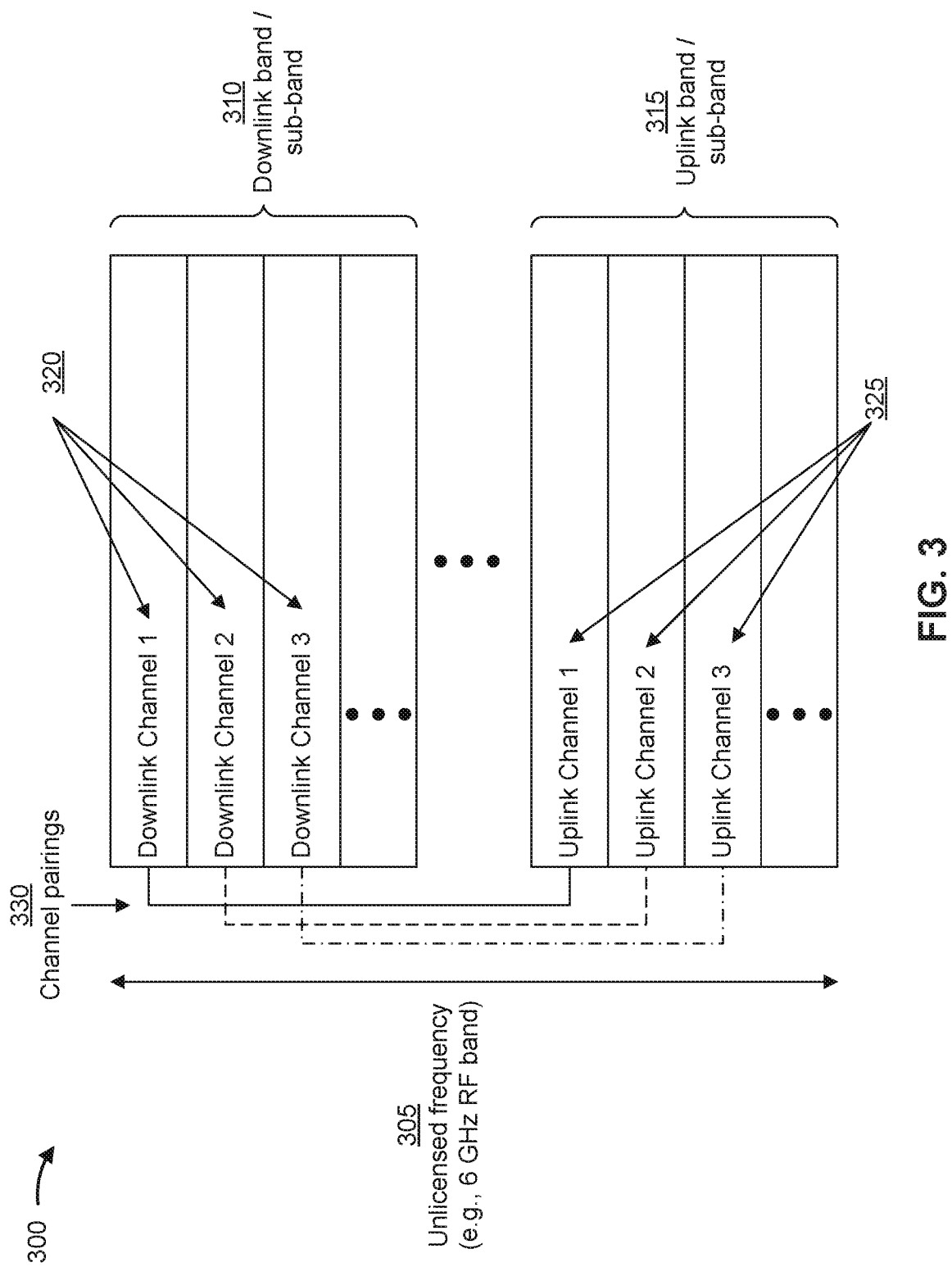
FIG. 3 is a diagram illustrating an example of an unlicensed radio frequency band, in accordance with various aspects of the present disclosure.

FIG. 3 is a diagram illustrating an example 300 of an unlicensed radio frequency band, in accordance with various aspects of the present disclosure.

To accommodate increasing traffic demands, there have been various efforts to improve spectral efficiency in wireless networks and thereby increase network capacity (e.g., via use of higher order modulations, advanced MIMO antenna technologies, multi-cell coordination techniques, and/or the like). Another way to potentially improve network capacity is to expand system bandwidth. However, available spectrum in lower frequency bands that have traditionally been licensed or otherwise allocated to mobile network operators has become very scarce. Accordingly, various technologies have been developed to enable a cellular radio access technology (RAT) to operate in unlicensed or other shared spectrum. For example, Licensed-Assisted Access (LAA) uses carrier aggregation on a downlink to combine LTE in a licensed frequency band with LTE in an unlicensed frequency band (e.g., the 2.4 and/or 5 GHz bands already populated by wireless local area network (WLAN) or "Wi-Fi" devices). In other examples, Enhanced LAA (eLAA) and Further Enhanced LAA (feLAA) technologies enable both uplink and downlink LTE operation in unlicensed spectrum, MulteFire is an LTE-based technology that operates in unlicensed and shared spectrum in a standalone mode, NR-U enables NR operation in unlicensed spectrum, and/or the like.

For example, as shown in FIG. 3, and by reference number 305, an unlicensed radio frequency (RF) band, such as a 6 gigahertz (GHz) unlicensed RF band, may span a frequency range and may utilize frequency division duplexing (FDD). In an FDD system, a first band (e.g., a first sub-band of the unlicensed RF band) may be used for downlink communication, as shown by reference number 310, and a second band (e.g., a second sub-band of the unlicensed RF band) may be used for uplink communication, as shown by reference number 315. "Downlink communication" may refer to communication from a control node to a node (e.g., that is controlled, configured, and/or scheduled by the control node), such as from a base station 110 to a UE 120, from a WLAN access point 140 to a WLAN station 150, and/or the like. "Uplink communication" may refer to communication from the node to the control node, such as from a UE 120 to a base station 110, from a WLAN station 150 to a WLAN access point 140, and/or the like.

As further shown in FIG. 3, and by reference number 320, the downlink band may be divided into multiple downlink channels, sometimes referred to as downlink frequency channels. Similarly, as shown by reference number 325, the uplink band may be divided into multiple uplink channels, sometimes referred to as uplink frequency channels. As shown by reference number 330, each downlink channel may correspond to a single uplink channel. This may be referred to as channel pairing, where a downlink channel is paired with an uplink channel. In this configuration, a control node and a node may use a particular downlink channel for downlink communication, and may use a particular uplink channel, that is paired with or corresponds to the particular downlink channel, for uplink communication. In example 300, downlink channel 1 is paired with uplink channel 1, downlink channel 2 is paired with uplink channel 2, downlink channel 3 is paired with uplink channel 3, and so on.

While the example 300 illustrated in FIG. 3 shows an unlicensed RF band that utilizes FDD, in some cases, an unlicensed communication channel may utilize time division duplexing (TDD). For example, in an unlicensed communication channel that utilizes TDD, uplink and downlink transmissions may be separated in time and conducted on the same frequency channel. However, unlike TDD in licensed spectrum, a subframe, slot, symbol and/or the like is not restricted to being configured for uplink communication or downlink communication, and may be configured for downlink transmissions by a base station or for uplink transmissions by a UE. Furthermore, unlicensed communication may support dynamic TDD, where an uplink-downlink allocation may change over time to adapt to traffic conditions. For example, to enable dynamic TDD, a wireless device (e.g., a base station, a UE, and/or the like) may determine when to transmit and in which resource to transmit according to an indication of a channel occupancy time structure. In general, the channel occupancy time may include multiple transmission intervals (e.g., multiple slots), and each transmission interval may include one or more downlink resources, one or more uplink resources, one or more flexible resources, and/or the like. In this way, the channel occupancy time structure reduces power consumption, channel access delay, and/or the like.

In an unlicensed RF band (e.g., the 6 GHz unlicensed RF band), all or a portion of the frequency band may be licensed to entities referred to as fixed service incumbents. Accordingly, when operating a cellular RAT in unlicensed spectrum (e.g., using LAA, eLAA, feLAA, MulteFire, NR-U, and/or the like), one challenge that arises is the need to ensure fair coexistence with incumbent (e.g., WLAN) devices that may be operating in the unlicensed spectrum. For example, prior to gaining access to and/or transmitting over an unlicensed channel, a transmitting device (e.g., base station 110, UE 120, and/or the like) may need to perform a listen-before-talk (LBT) procedure to contend for access to the unlicensed channel. The LBT procedure may include a clear channel assessment (CCA) procedure to determine whether the unlicensed channel is available (e.g., unoccupied by other transmitters). In particular, a device performing a CCA procedure may detect an energy level on an unlicensed channel and determine whether the energy level satisfies (e.g., is less than or equal to) a threshold, sometimes referred to as an energy detection threshold and/or the like. When the energy level satisfies (e.g., is below) the threshold, the LBT procedure is deemed to be successful and the transmitting device may gain access to the unlicensed channel for a duration referred to as a channel occupancy time. During the channel occupancy time, the transmitting device can perform one or more transmissions without having to perform any additional LBT operations. However, when the energy level fails to satisfy (e.g., equals or exceeds) the energy detection threshold, the LBT procedure fails and contention to access the unlicensed channel by the transmitting device is unsuccessful.

In cases where the LBT procedure fails due to the CCA procedure, resulting in a determination that the unlicensed channel band is unavailable (e.g., because the energy level detected on the unlicensed channel indicates that another device is already using the channel), the CCA procedure may be performed again at a later time. In environments in which the transmitting device may be starved of access to an unlicensed channel (e.g., due to WLAN activity or transmissions by other devices), an extended CCA (eCCA) procedure may be employed to increase the likelihood that the transmitting device will successfully obtain access to the unlicensed channel. For example, a transmitting device performing an eCCA procedure may perform a random quantity of CCA procedures (from 1 to q), in accordance with an eCCA counter. If and/or when the transmitting device senses that the channel has become clear, the transmitting device may start a random wait period based on the eCCA counter and start to transmit if the channel remains clear over the random wait period.

As indicated above, FIG. 3 is provided as an example. Other examples may differ from what is described with regard to FIG. 3.

Figure 4A:
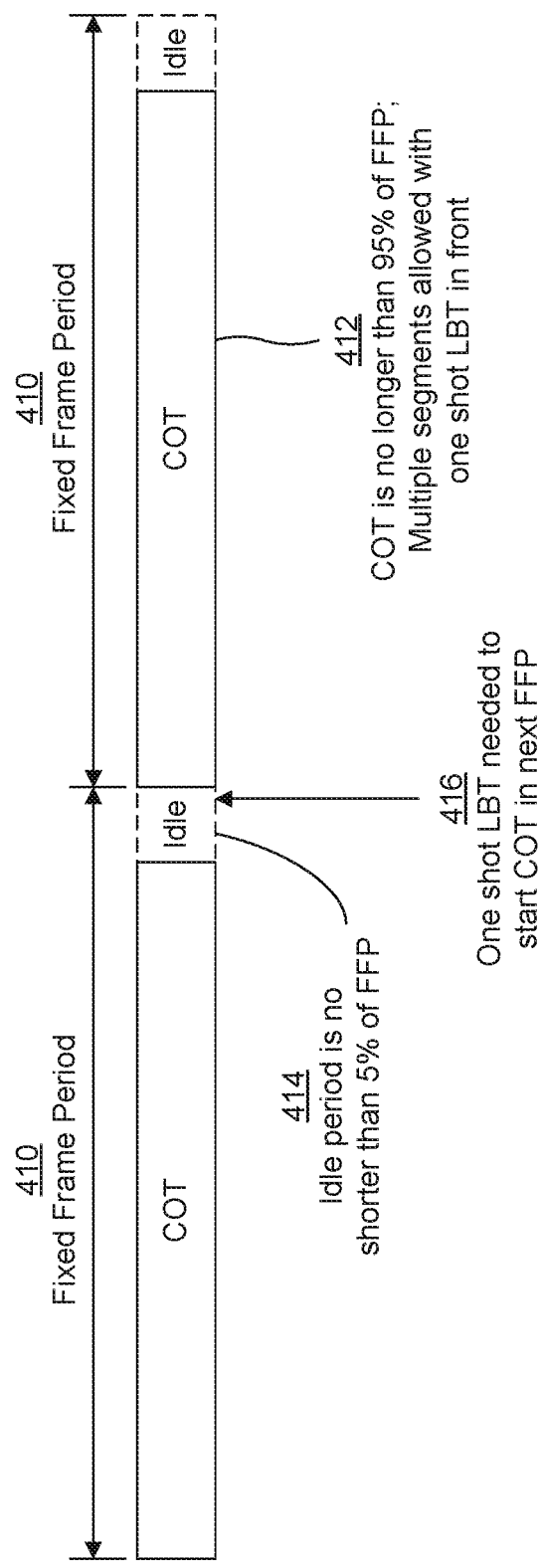
FIGS. 4A-4B are diagrams illustrating examples of a fixed frame period (FFP) that includes a channel occupancy time during which one or more devices may conduct transmissions in an unlicensed channel, in accordance with various aspects of the present disclosure.
Figure 4B:
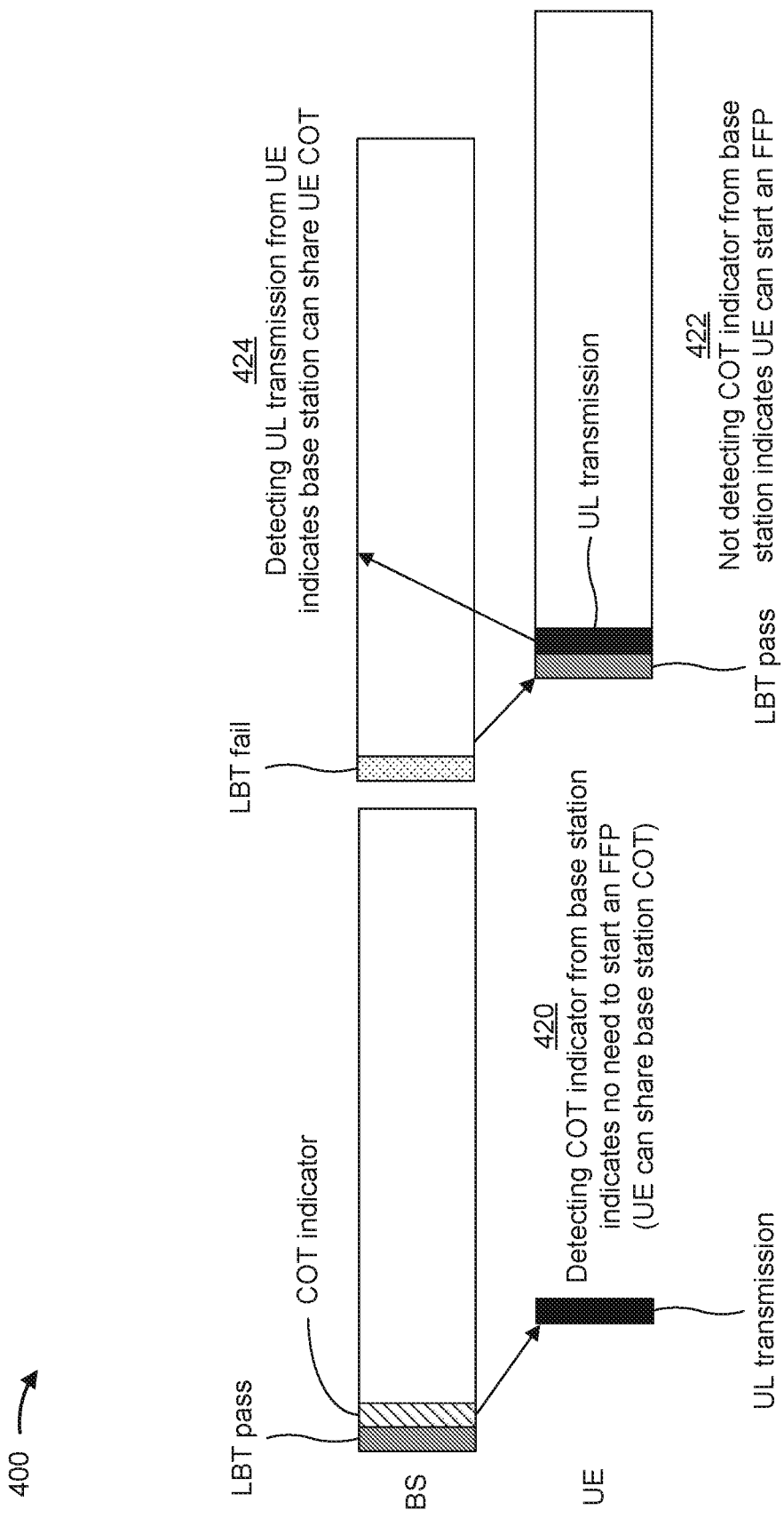

FIGS. 4A-4B are diagrams illustrating examples 400 of a fixed frame period that includes a channel occupancy time during which one or more devices may conduct transmissions in an unlicensed channel, in accordance with various aspects of the present disclosure.

In a wireless network that supports communication in unlicensed spectrum, an LBT procedure may be performed in either a load based equipment (LBE) mode or a frame based equipment (FBE) mode. In the LBE mode, a transmitting device may perform channel sensing in association with an LBT procedure at any time, and a random backoff is used in cases where the unlicensed channel is found to be busy. In the FBE mode, a base station may perform channel sensing in association with an LBT procedure at fixed time instances, and the base station waits until a fixed time period has elapsed before sensing the unlicensed channel again in cases where the unlicensed channel is found to be busy. In particular, the fixed time instances when the base station performs channel sensing may be defined according to a fixed frame period (FFP).

For example, FIG. 4A depicts an example FFP 410 that a base station may use to communicate in unlicensed spectrum. As shown in FIG. 4A, the FFP 410 may include a channel occupancy time (COT) 412 during which the base station may transmit one or more downlink communications. In some cases, as described below with reference to FIG. 4B, the base station may share the channel occupancy time 412 with a UE to enable the UE to transmit one or more uplink communications during the channel occupancy time 412. As shown in FIG. 4A, the FFP 410 may further include an idle period 414 (sometimes referred to as a gap period and/or the like) at an end of the FFP 410, after the channel occupancy time 412. In particular, the idle period 414 of the FFP 410 provides time to perform an LBT procedure prior to a next FFP 410. The FFP 410, including the channel occupancy time 412 and the idle period 414, may have a duration of 1 millisecond (ms), 2 ms, 2.5 ms, 4 ms, 5 ms, or 10 ms. Within every two radio frames (e.g., even-numbered radio frames), starting positions of the FFPs 410 may be given by i*P, where i={0, 1, . . . , 20/P−1} and P is the duration of the FFP 410 in ms. For a given subcarrier spacing (SCS), the idle period 414 is a ceiling value for a minimum idle period allowed by regulations, divided by Ts, where the minimum duration of the idle period 414 is a maximum of 100 microseconds (μs) and 5% of the duration of the FFP 410, and Ts is the symbol duration for the given SCS. Accordingly, the idle period 414 may occupy no less than 5% of the duration of the FFP 410, and the channel occupancy time 412 may occupy no more than 95% of the duration of the FFP 410.

In FBE mode, an FFP configuration may be indicated in a system information block (e.g., SIB-1) or signaled to a UE in UE-specific radio resource control (RRC) signaling (e.g., for an FBE secondary cell use case). If the network indicates that FBE mode is to be used for fallback downlink and/or uplink grants, for an indication of Category 2 LBT (25 μs) (e.g., LBT without random backoff) or Category 4 LBT (e.g., LBT with random backoff and a variable size contention window), the UE may perform channel sensing measurements in one 9 μs slot (e.g., one shot LBT) within a 25 μs interval. UE transmissions within the FFP 410 may occur if the UE detects one or more downlink signals or downlink channels from the base station (e.g., a physical downlink control channel (PDCCH), a synchronization signal block (SSB), a physical broadcast channel (PBCH), remaining minimum system information (RMSI), a group common PDCCH (GC-PDCCH), and/or the like) within the FFP 410. The same 2-bit field may be used in LBE mode and FBE mode to indicate an LBT type, a cyclic prefix extension, a channel access priority class indication, and/or the like.

In Release 16 NR unlicensed (NR-U) FBE mode, only a base station can act as an initiating device to acquire a channel occupancy time, and a UE may act only as a responding device (e.g., sharing a channel occupancy time acquired by a base station). In NR-U FBE mode, channel access rules may thus be as follows. If the base station is to initiate a channel occupancy time 412, a Category 1 (Cat-1) LBT procedure may not apply and the base station may perform a Category 2 (Cat-2) LBT procedure in the idle period 414 just prior to an FFP 410. If the base station is to transmit a downlink burst in the channel occupancy time 412 acquired by the base station, the base station may perform a Cat-1 LBT procedure if a gap from a previous downlink burst or a previous uplink burst is within 16 μs, and may otherwise perform a Cat-2 LBT procedure if the gap is more than 16 μs. If the UE is to transmit an uplink burst in the channel occupancy time 412 acquired by the base station, the UE may perform a Cat-1 LBT procedure if the gap from the previous downlink or uplink burst is within 16 μs, and may otherwise perform the Cat-2 LBT procedure if the gap is greater than 16 μs. Notably, the Cat-2 LBT procedure for FBE mode may be different from the Cat-2 LBT procedure (25 μs or 16 μs) in LBE mode. In some aspects, one 9 μs measurement right before the transmission may be needed, with at least 4 μs for measurement. As shown by reference number 416, the 9 μs measurement needed to start a channel occupancy time 412 in a next FFP 410 may be referred to as a one-shot LBT. However, neither the Cat-1 LBT procedure nor the Cat-2 LBT procedure applies in cases where the UE is to initiate a channel occupancy time in FBE mode, because a UE cannot initiate a channel occupancy time in Release 16 NR-U FBE mode.

Accordingly, although a wireless network can be configured to use unlicensed spectrum to achieve faster data rates, provide a more responsive user experience, offload traffic from licensed spectrum, and/or the like, one limitation in FBE mode is that a UE cannot initiate a channel occupancy time to perform uplink transmissions. Accordingly, in order to improve access, efficiency, latency, and/or the like for an unlicensed channel, a wireless network may permit a base station to share a channel occupancy time with a UE. For example, as shown in FIG. 4B, and by reference number 420, a base station may transmit a COT indicator to one or more UEs (e.g., using group common downlink control information (DCI)) in cases where the base station successfully contends for access to an unlicensed channel (e.g., by performing an LBT procedure that passes), and the COT indicator from the base station may indicate that the one or more UEs do not need to start an FFP. Instead, the one or more UEs can share the channel occupancy time acquired by the base station and transmit one or more uplink communications during the shared channel occupancy time.

In a fully controlled environment, permitting only the base station to contend for access to the unlicensed channel and share a channel occupancy time initiated by the base station with one or more UEs may be sufficient. For example, a "fully controlled" environment may refer to an environment that is restricted or otherwise controlled such that no other RAT or operators are operating in the coverage area. Consequently, in a fully controlled environment, an LBT procedure may always pass, even in FBE mode. In practice, however, a fully controlled environment may be difficult to achieve because there may be a chance that some other RAT is operating even in cases where the environment is supposedly cleared. For example, an employee working on an otherwise cleared factory floor may be carrying a WLAN station that transmits a WLAN access probe even though no WLAN access points are deployed in the environment. Accordingly, in an almost fully controlled environment, there is a small chance that an LBT procedure performed by a base station will fail, which may result in unacceptable performance for services having stringent quality of service requirements (e.g., ultra-reliable low-latency communication (URLLC), industrial internet of things (IIoT) applications, and/or the like). For example, even in cases where an LBT failure rate is as low as $10^{-3}$, there is a $10^{-3}$ probability that a URLLC packet scheduled to be delivered in an FFP cannot be delivered because both the base station and any UE(s) in communication with the base station have to surrender the entire FFP due to failure of an LBT procedure performed by the base station at the beginning of the FFP. The $10^{-3}$ failure probability may be insufficient to satisfy a URLLC reliability requirement, which typically requires a reliability of $10^{-6}$ or better. Furthermore, these problems are exacerbated in uncontrolled environments where there may be many incumbent and/or competing devices contending for access to the unlicensed channel.

Accordingly, in cases where only a base station can contend for access to an unlicensed channel in FBE mode, a UE may be unable to transmit on an uplink if an LBT procedure performed by the base station fails and/or the base station does not perform an LBT procedure because the base station does not have downlink data to transmit. Consequently, a UE may be permitted to act as an initiating device to perform an LBT procedure and acquire a channel occupancy time in the FBE mode in cases where the base station fails the LBT procedure or the UE otherwise does not detect a COT indicator from the base station (e.g., because the base station did not perform the LBT procedure due to a lack of downlink activity, due to impairments in a wireless channel interfering with downlink detection, and/or the like). For example, as shown by reference number 422, the UE may perform an LBT procedure to start an FFP and initiate a COT in which to transmit one or more uplink communications in cases where the UE does not detect a COT indicator from the base station. Accordingly, as further shown by reference number 424, the UE may transmit one or more uplink communications over the unlicensed channel if the LBT procedure passes, and detecting the uplink transmission from the UE may indicate that the base station can share the channel occupancy time acquired by the UE to perform downlink transmissions.

In some aspects, allowing the UE to initiate a channel occupancy time in FBE mode may improve access to the unlicensed channel, reduce uplink latency, conserve power, reduce interference, and/or the like. For example, when the UE initiates a channel occupancy time, the UE can use the channel occupancy time to transmit a physical random access channel (PRACH) for initial network access. In particular, during initial network access, the UE may not yet be configured with a system information radio network temporary identifier (SI-RNTI) or another known RNTI used to monitor for a downlink transmission (e.g., downlink control information (DCI) scrambled with the SI-RNTI or other known RNTI) to determine whether the base station has acquired a channel occupancy time. This may restrict the ability of the UE to transmit a PRACH for initial network access, whereby enabling the UE to initiate a channel occupancy time may enable uplink PRACH transmissions before the UE has been configured to monitor for downlink transmissions from the base station.

Furthermore, allowing the UE to initiate a channel occupancy time enables the UE to transmit a physical uplink control channel (PUCCH) and/or a physical uplink shared channel (PUSCH) earlier in an FFP associated with a base station. For example, when sharing a channel occupancy time acquired by a base station, the UE has to confirm that the base station acquired the channel occupancy time by detecting downlink activity in an earlier portion of the FFP in order to enable transmissions in a later portion of the FFP (e.g., the UE needs to leave time in the earlier portion of the base station FFP to allow time for the downlink transmission from the base station, time for the UE to process the downlink transmission, and/or the like). Furthermore, allowing the UE to initiate a channel occupancy time may save power at the base station and/or reduce interference over the unlicensed channel. For example, in order to share a channel occupancy time and enable uplink transmission within the shared channel occupancy time, the base station needs to actively transmit one or more downlink communications in the earlier portion of the FFP, even if the base station does not have a need to transmit the downlink communication(s). This may result in additional power consumption at the base station and extra interference on the unlicensed channel, which can be avoided by allowing the UE to initiate a channel occupancy time. Furthermore, allowing the UE to initiate a channel occupancy time rather than relying on sharing a channel occupancy time acquired by the base station may avoid problems that may otherwise arise where downlink signal detection has a reliability limitation.

As indicated above, FIGS. 4A-4B are provided as an example. Other examples may differ from what is described with regard to FIGS. 4A-4B.

Figure 5A:
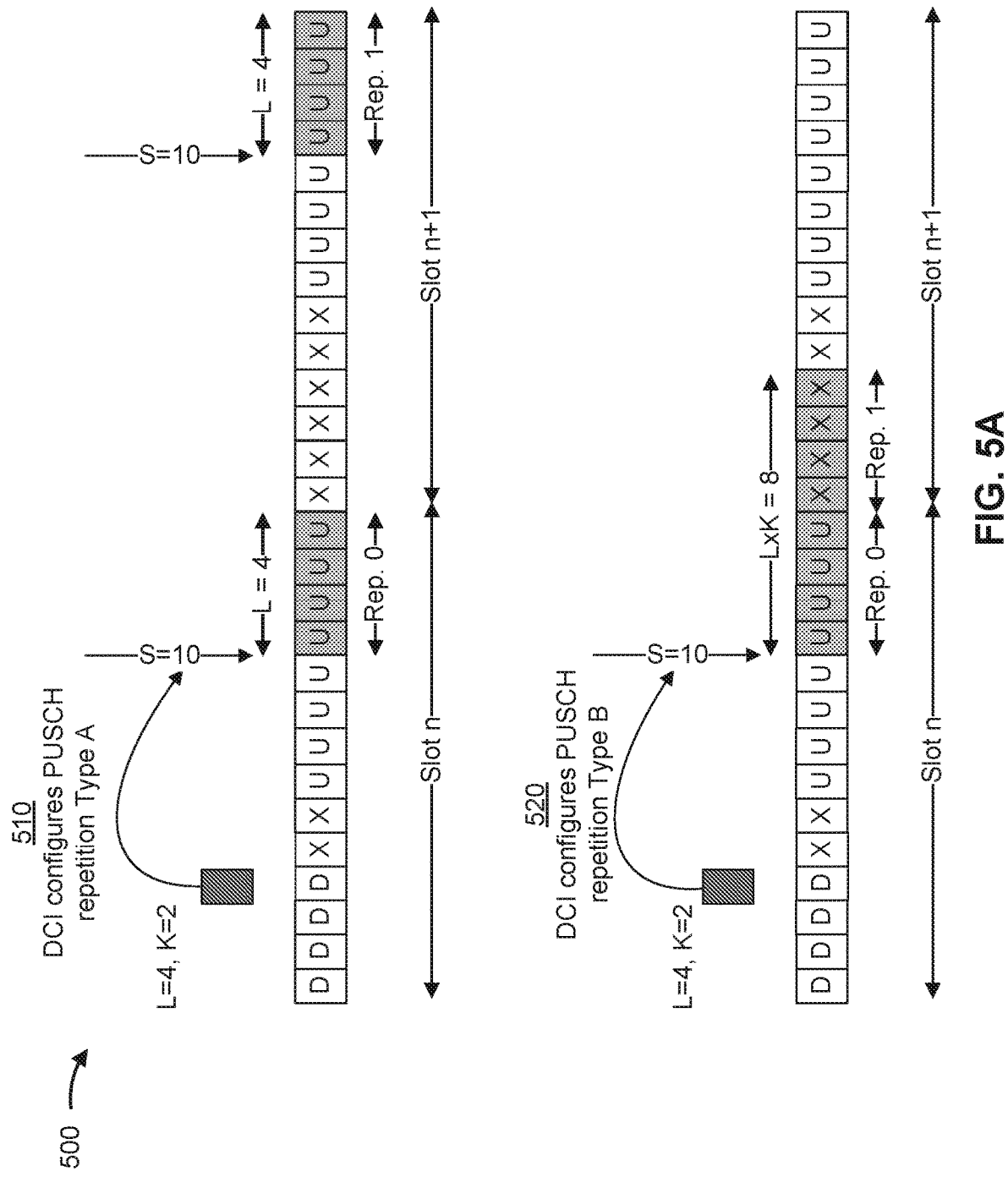
FIGS. 5A-5B are diagrams illustrating examples of physical uplink shared channel (PUSCH) repetitions, in accordance with various aspects of the present disclosure.
Figure 5B:
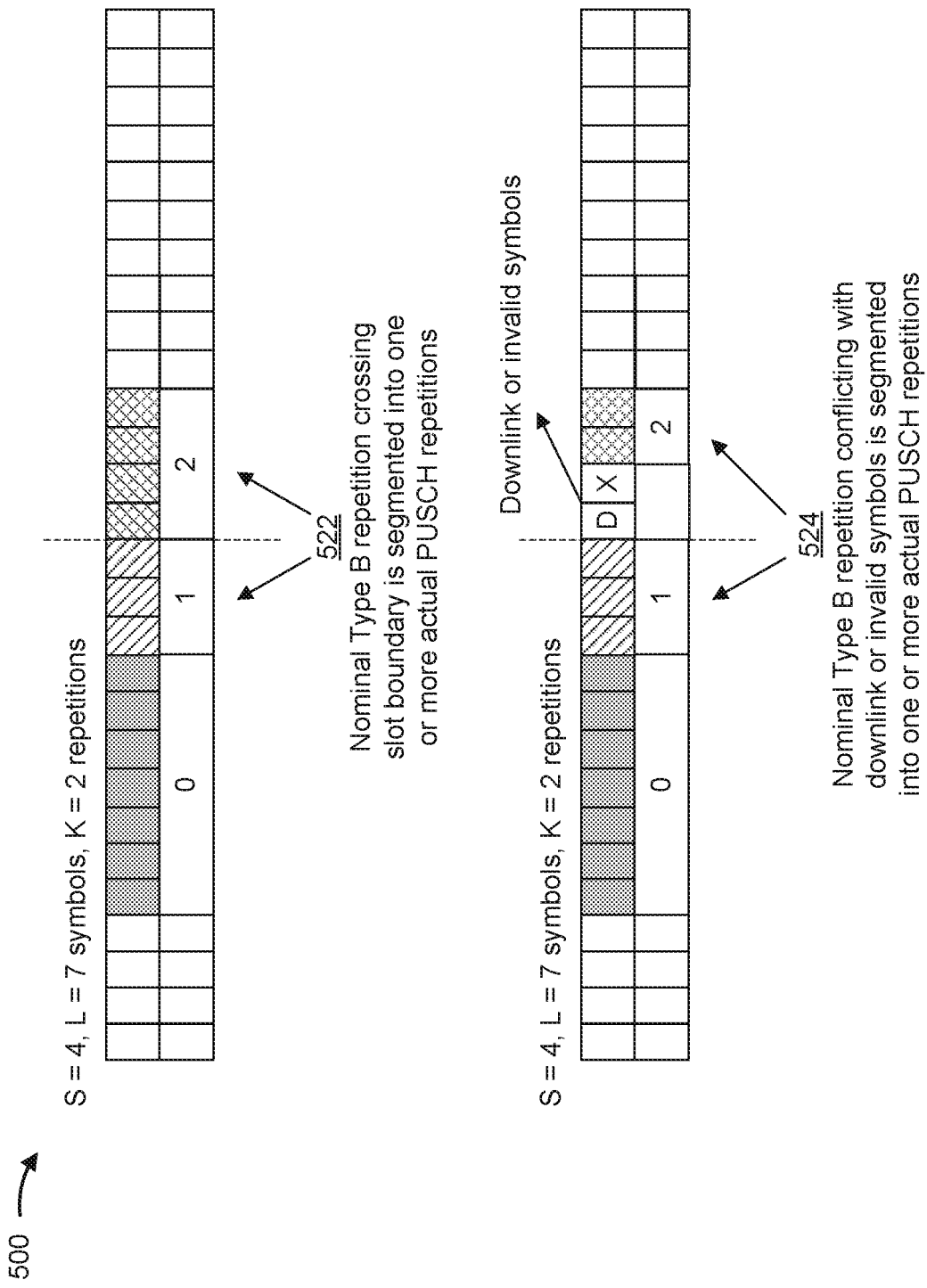

FIGS. 5A-5B are diagrams illustrating examples 500 of PUSCH repetitions, in accordance with various aspects of the present disclosure. In a wireless network, such as an NR network, a UE may transmit repetitions of a particular uplink communication to increase reliability and/or robustness (e.g., to increase a likelihood that a base station will be able to successfully detect the UE and/or decode the uplink communication). For example, a UE may be configured to transmit multiple repetitions of a PUSCH communication in multiple transmission occasions, using multiple panels, and/or to multiple TRPs, among other examples. In this way, the UE reduces a likelihood that an interruption to an uplink transmission on a wireless link causes the uplink communication to be dropped (e.g., as a result of an object physically blocking a transmission path on the wireless link and/or other communications interfering with the wireless link, among other examples). In some cases, the UE may vary one or more transmission parameters when transmitting repetitions of an uplink communication. For example, the UE may transmit different repetitions of a PUSCH communication (e.g., the same transport block) using multiple different PUSCH transmission occasions occurring within different slots, mini-slots, symbols, and/or the like. In general, repetitions of a PUSCH communication associated with a dynamic grant and/or a configured grant may have one of two types, which may be referred to herein as Type A and Type B.

For example, as shown in FIG. 5A, and by reference number 510, a UE may receive downlink control information (DCI) that configures a PUSCH repetition having Type A. In some aspects, the DCI that configures the PUSCH repetition may indicate that the UE is to transmit K repetitions of a PUSCH communication across K consecutive slots, and the DCI may further indicate a start and length indicator value (SLIV) to be applied to each PUSCH repetition. For example, the SLIV may indicate a starting symbol within a slot, S, and a symbol length, L, which are applied to the K repetitions of the PUSCH communication across the K consecutive slots. For example, in FIG. 5A, the UE is configured to transmit two Type A repetitions of a PUSCH communication (K=2), with each PUSCH repetition starting from the tenth symbol in a slot (S=10) and each PUSCH repetition having a length of four symbols (L=4). Accordingly, when a UE is configured to transmit multiple PUSCH repetitions having a Type A configuration, the UE transmits K repetitions of a PUSCH communication across K consecutive slots with the same SLIV applied to each PUSCH repetition, and an individual PUSCH repetition is not permitted to cross a slot boundary.

Additionally, or alternatively, as shown by reference number 520, a UE may receive DCI that configures a PUSCH repetition having Type B. In some aspects, the DCI that configures the Type B repetition may schedule the Type B repetition within and/or across slots (e.g., a Type B repetition may be permitted to cross a slot boundary), may dynamically indicate that the UE is to transmit K nominal PUSCH repetitions that each have a nominal symbol length, L, and may indicate that the K nominal PUSCH repetitions are to be transmitted consecutively starting from a particular symbol within a slot, S, where S and L are indicated in the SLIV parameter. Furthermore, in some aspects, the DCI may indicate an inter-nominal PUSCH frequency hopping applicable to the K nominal PUSCH repetitions. For example, in FIG. 5B, the UE is configured to transmit two Type B repetitions of a PUSCH communication (K=2), each of which have a length of four symbols (L=4), and which are transmitted across eight consecutive symbols (L*K=8) starting from the tenth symbol in a slot (S=10).

Accordingly, when a UE is configured to transmit multiple nominal PUSCH repetitions having a Type B configuration back-to-back, there is a possibility that one or more of the nominal PUSCH repetitions will cross a slot boundary and/or collide with a downlink symbol or an invalid symbol (e.g., a guard symbol and/or the like). The UE may therefore determine whether a nominal PUSCH repetition crosses a slot boundary and/or collides with downlink or invalid symbols (e.g., according to one or more predefined rules or semi-static RRC configuration information, among other examples), and if so, may segment the nominal PUSCH repetition into one or more actual repetitions around the slot boundary and/or the downlink or invalid symbol(s).

For example, as shown in FIG. 5B, and by reference number 522, the UE may be provided a Type B configuration to transmit two nominal PUSCH repetitions (K=2), each of which has a length of seven symbols (L=7), and which are transmitted across fourteen consecutive symbols (L*K=14) starting from the fourth symbol in a slot (S=10). In this case, the first nominal PUSCH repetition covers seven symbols in a first slot, and the second nominal PUSCH repetition covers the last three symbols in the first slot and the first four symbols in the next slot. In other words, the second nominal PUSCH repetition crosses a slot boundary. Accordingly, in some aspects, the UE may segment the second nominal PUSCH repetition around the slot boundary, resulting in two actual PUSCH repetitions that do not cross a slot boundary. For example, as shown in FIG. 5B, the second nominal PUSCH repetition may be segmented into a first actual PUSCH repetition that covers the last three symbols in the first slot and a second actual PUSCH repetition that covers the first four symbols in the next slot.

Furthermore, in cases where a nominal PUSCH repetition collides with one or more downlink symbols and/or one or more invalid symbols, the nominal PUSCH repetition may be segmented around the downlink and/or invalid symbol(s). For example, as shown by reference number 524, the first symbol in the second slot is a downlink symbol and the second symbol in the second slot is an invalid symbol (e.g., a guard symbol between a downlink and uplink symbol). Accordingly, in addition to segmenting the second nominal PUSCH repetition around the slot boundary, the nominal repetition may be segmented around the downlink or invalid symbols. For example, in some aspects, the UE may identify, for each nominal PUSCH repetition that collides with one or more downlink and/or invalid symbols, one or more remaining symbols that are considered potentially valid symbols in which an actual PUSCH repetition having Type B can be transmitted. Accordingly, if the number of potentially valid symbols is greater than zero for a nominal PUSCH repetition, the nominal PUSCH repetition may be segmented into one or more actual PUSCH repetitions, each of which consists of a consecutive set of all potentially valid symbols that can be used to transmit a PUSCH repetition within a slot (e.g., uplink symbols, flexible symbols, and/or the like), except that an actual PUSCH repetition that covers a single symbol is dropped (e.g., not transmitted) unless the nominal length, L, has a configured value of one (1).

In some cases, a UE may be configured to transmit PUSCH repetitions having Type A and/or PUSCH repetitions having Type B over an unlicensed channel. In such cases, transmissions over the unlicensed channel may be configured in FBE mode, whereby an FFP includes an idle period in which a base station and a UE served by the base station are to refrain from transmitting. For example, as described above, devices may be required to refrain from transmitting during the idle period to enable coexistence with WLAN devices that may be attempting to transmit over the unlicensed channel, or to provide time to perform an LBT procedure prior to a next FFP, among other examples. However, behavior to handle PUSCH repetitions that overlap with the idle period of an FFP in FBE mode is generally undefined.

Some aspects described herein relate to techniques and apparatuses to handle one or more PUSCH repetitions that at least partially overlap with an idle period in FBE mode. For example, a UE may determine that a PUSCH repetition overlaps with an idle period associated with an FFP for communicating over an unlicensed channel in FBE mode, and the UE may refrain from transmitting over the unlicensed channel during one or more symbols of the PUSCH repetition that coincide with the idle period. For example, the UE may refrain from transmitting a PUSCH repetition having Type A in cases where the PUSCH repetition overlaps with the idle period in an FFP associated with a base station and/or an FFP associated with the UE. Additionally, or alternatively, the UE may conditionally refrain from transmitting the Type A repetition that overlaps with the idle period, depending on whether a node associated with the FFP acquired a channel occupancy time. In the case of a Type B repetition that at least partially overlaps with the idle period in the FFP, the UE may segment the nominal PUSCH repetition around the idle period and transmit only actual repetitions that do not overlap with the idle period. Additionally, or alternatively, the UE may conditionally segment a nominal Type B repetition that overlaps with the idle period, depending on whether a node associated with the FFP acquired a channel occupancy time. In this way, the UE may transmit one or more PUSCH repetitions over an unlicensed channel while also ensuring that no PUSCH transmissions occur during an idle period.

As indicated above, FIGS. 5A-5B are provided as an example. Other examples may differ from what is described with regard to FIGS. 5A-5B.

Figure 6:
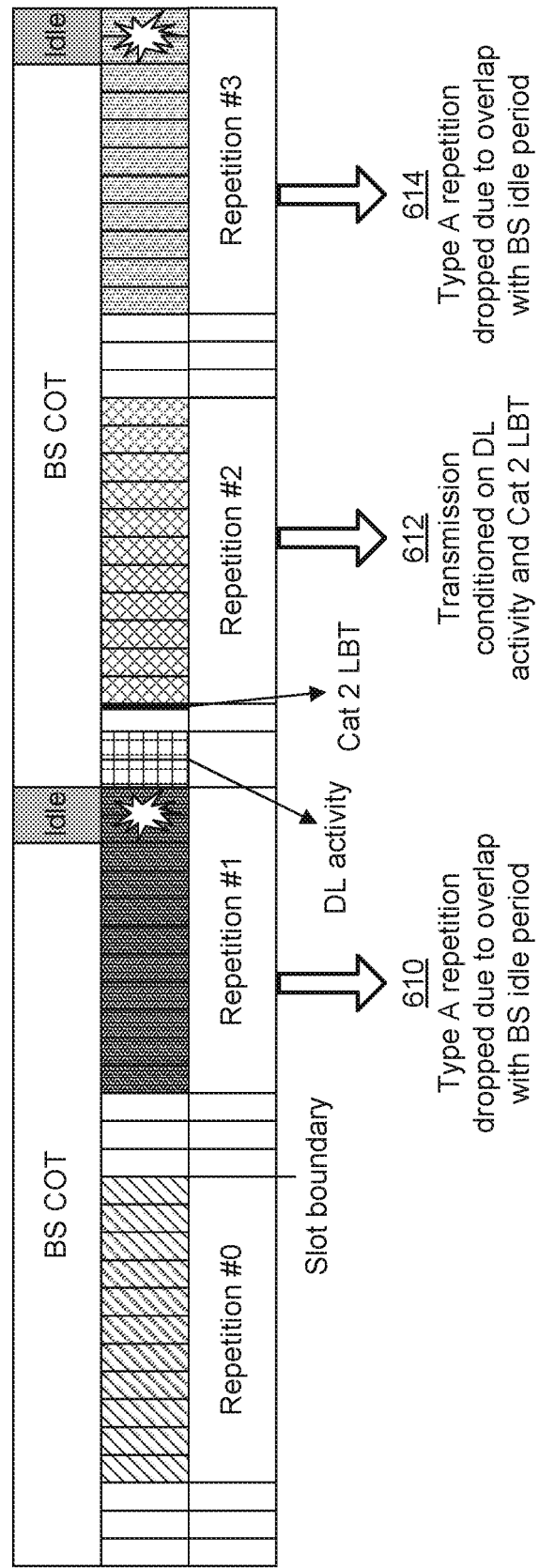
FIGS. 6, 7, 8A-8D, and 9A-9D are diagrams illustrating examples associated with PUSCH repetition handling in a frame based equipment (FBE) mode idle period, in accordance with various aspects of the present disclosure.

FIG. 6 is a diagram illustrating an example 600 associated with PUSCH repetition handling in an FBE mode idle period, in accordance with various aspects of the present disclosure. As shown in FIG. 6, example 600 includes a base station that may communicate with a UE in a wireless network. As described herein, the base station and the UE communicate on an uplink and a downlink using one or more unlicensed channels in FBE mode. Furthermore, in example 600, the base station may initiate an LBT procedure to acquire a channel occupancy time in FBE mode, and the UE may share the channel occupancy time acquired by the base station in cases where the UE detects one or more downlink transmissions from the base station. In FIG. 6, the UE may be configured to transmit one or more PUSCH repetitions having Type A, and an FFP configured for the base station may include an idle period during which neither the base station nor the UE are allowed to transmit. Accordingly, in cases where one or more of the PUSCH repetitions having Type A at least partially overlap with the idle period in the FFP configured for the base station, the UE may determine how to handle the PUSCH repetition(s) at least partially overlapping with the idle period.

For example, when the UE is configured to transmit one or more PUSCH repetitions that are associated with a Type A configuration, the UE may drop any of the PUSCH repetitions that overlap with the idle period in the FFP associated with the base station. In other words, the UE may refrain from transmitting a PUSCH repetition having Type A in cases where the PUSCH repetition overlaps with the idle period in the FFP associated with the base station. In this way, other devices (e.g., LBE devices) may have an opportunity to perform a Cat-4 LBT procedure during the idle period in order to acquire access to the unlicensed channel (s). Furthermore, in cases where there are one or more PUSCH repetitions scheduled in a next FFP (e.g., after the idle period interrupting the transmission of PUSCH repetitions), transmissions of the PUSCH repetitions in the next FFP may be conditional, based at least in part on whether the UE detects one or more downlink transmissions from the base station in the next FFP. Accordingly, the UE may resume transmitting PUSCH repetitions that are scheduled in the next FFP based at least in part on detecting one or more downlink transmissions from the base station in the next FFP, subject to the restriction that a PUSCH repetition having Type A is not transmitted during the idle period in the next FFP. For example, the UE may resume transmitting the PUSCH repetitions in the next FFP without sensing the unlicensed channel in cases where a gap between a downlink and uplink transmission burst is no more than 16 µs. Otherwise, in cases where the gap between the downlink and uplink transmission burst is more than 16 µs, the UE may resume transmitting the PUSCH repetitions in the next FFP after performing a successful Cat-2 LBT procedure (e.g., sensing that the unlicensed channel is idle for at least a sensing slot duration of 9 µs within a 25 µs interval ending immediately before transmission).

For example, as shown in FIG. 6, the UE may be configured to transmit four PUSCH repetitions having Type A across four consecutive slots, with each PUSCH repetition covering 11 symbols and each PUSCH repetition starting from the fourth symbol in a slot. In this case, the UE transmits a first PUSCH repetition (Repetition #0) that does not overlap with the idle period in the FFP associated with the base station. However, a second PUSCH repetition (Repetition #1) overlaps with the idle period in the FFP associated with the base station. Accordingly, as shown by reference number 610, the UE refrains from transmitting the second PUSCH repetition due to the overlap with the idle period in the FFP associated with the base station. Furthermore, in example 600, two more PUSCH repetitions are scheduled in a next FFP associated with the base station. Accordingly, as shown by reference number 612, the UE may resume transmission of the PUSCH repetitions in the next FFP based at least in part on detecting downlink activity during a channel occupancy time of the FFP. For example, in FIG. 6, the gap between the downlink and uplink transmission burst may exceed 16 µs, whereby the UE may perform a Cat-2 LBT procedure just prior to a third PUSCH repetition (Repetition #2), and resume transmitting the PUSCH repetitions if the Cat-2 LBT procedure passes. Alternatively, the UE may resume transmitting the PUSCH repetitions without performing an LBT procedure if downlink activity is detected and the gap between the downlink and uplink transmission burst does not exceed 16 µs. As further shown by reference number 614, a fourth PUSCH repetition (Repetition #3) overlaps with the idle period in the next FFP associated with the base station, whereby the UE refrains from transmitting the fourth PUSCH repetition due to the overlap with the idle period in the FFP associated with the base station.

As indicated above, FIG. 6 is provided as an example. Other examples may differ from what is described with regard to FIG. 6.

Figure 7:
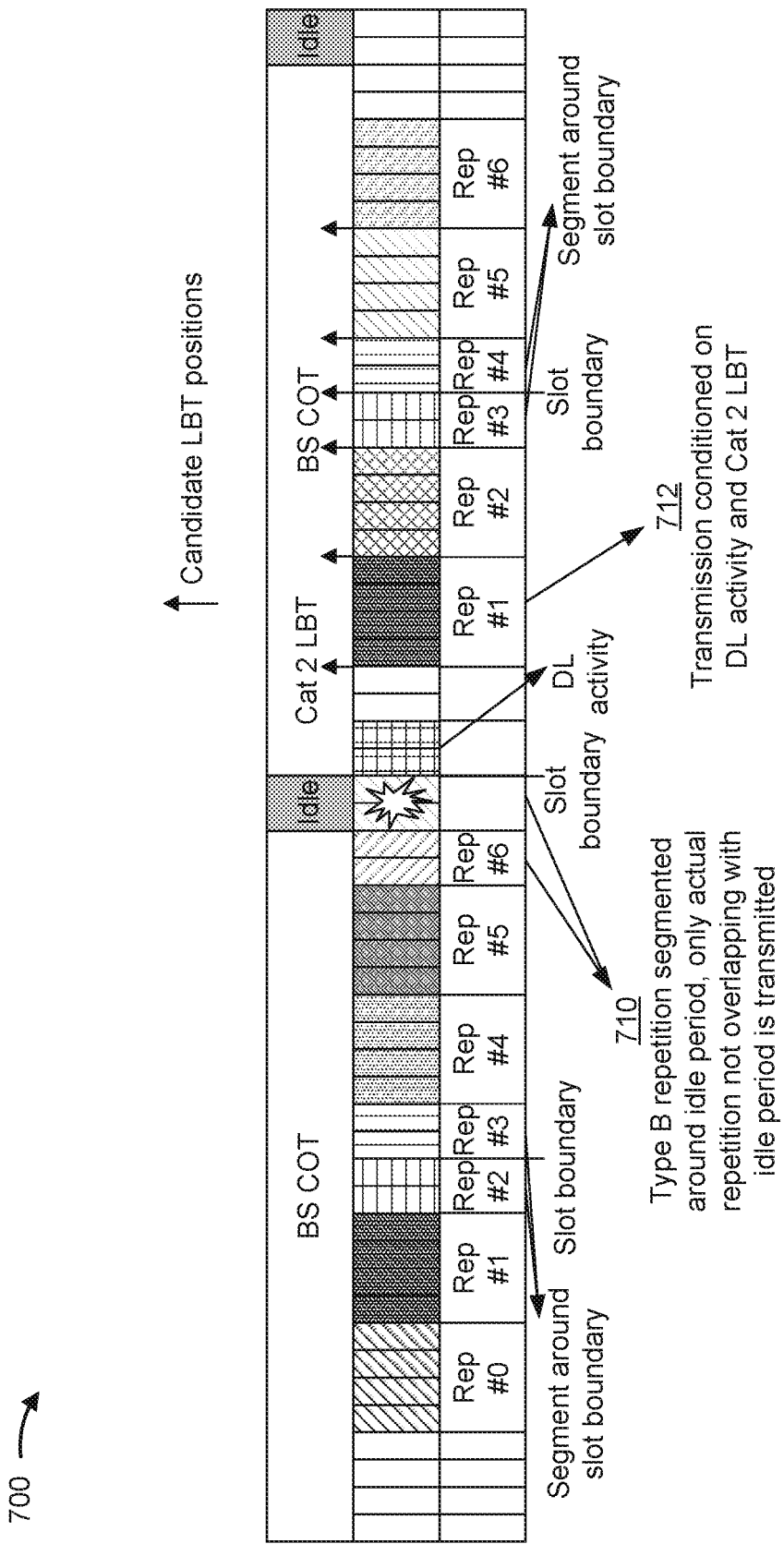

FIG. 7 is a diagram illustrating an example 700 associated with PUSCH repetition handling in an FBE mode idle period, in accordance with various aspects of the present disclosure. As shown in FIG. 7, example 700 includes a base station that may communicate with a UE in a wireless network. As described herein, the base station and the UE communicate on an uplink and a downlink using one or more unlicensed channels in FBE mode. Furthermore, in example 700, the base station may initiate an LBT procedure to acquire a channel occupancy time in FBE mode, and the UE may share the channel occupancy time acquired by the base station in cases where the UE detects one or more downlink transmissions from the base station. In FIG. 7, the UE may be configured to transmit one or more PUSCH repetitions having Type B, and an FFP configured for the base station may include an idle period during which neither the base station nor the UE are allowed to transmit. Accordingly, in cases where one or more of the PUSCH repetitions having Type B at least partially overlap with the idle period in the FFP configured for the base station, the UE may determine how to handle the PUSCH repetition(s) at least partially overlapping with the idle period.

For example, when the UE is configured to transmit a nominal PUSCH repetition that is associated with a Type B configuration and overlaps with the idle period in the FFP associated with the base station, the UE may segment the nominal PUSCH repetition around the idle period, which results in one or more actual repetitions. Accordingly, the UE may transmit only one or more actual PUSCH repetitions that do not overlap with the idle period in the FFP associated with the base station, except that an actual PUSCH repetition that occupies a single symbol may also be dropped. In other words, the UE may refrain from transmitting a PUSCH repetition having Type B during one or more symbols that coincide with the idle period in the FFP associated with the base station. In this way, other devices (e.g., LBE devices) may have an opportunity to perform a Cat-4 LBT procedure during the idle period in order to acquire access to the unlicensed channel(s). Furthermore, in cases where there are one or more PUSCH repetitions scheduled in a next FFP (e.g., after the idle period interrupting the transmission of PUSCH repetitions), transmissions of the PUSCH repetitions in the next FFP may be conditional, based at least in part on whether the UE detects one or more downlink transmissions from the base station in the next FFP. Accordingly, the UE may resume transmitting PUSCH repetitions that are scheduled in the next FFP based at least in part on detecting one or more downlink transmissions from the base station in the next FFP, subject to the restriction that a PUSCH repetition having Type B that overlaps with the idle period in the next FFP is segmented around the idle period. For example, the UE may resume transmitting the PUSCH repetitions in the next FFP without sensing the unlicensed channel in cases where a gap between a downlink and uplink transmission burst is no more than 16 µs. Otherwise, in cases where the gap between the downlink and uplink transmission burst is more than 16 µs, the UE may resume transmitting the PUSCH repetitions in the next FFP after performing a successful Cat-2 LBT procedure (e.g., sensing that the unlicensed channel is idle for at least a sensing slot duration of 9 µs within a 25 µs interval ending immediately before transmission).

For example, as shown in FIG. 7, the UE may be configured to transmit six consecutive nominal PUSCH repetitions having Type B starting from a fifth symbol in a slot, with each PUSCH repetition having a nominal length of 4 symbols. In this case, the UE transmits the first two nominal PUSCH repetitions (Rep #0 and Rep #1) that do not cross a slot boundary, do not collide with downlink or invalid symbols, and do not overlap with the idle period in the FFP associated with the base station. However, a third nominal PUSCH repetition crosses a slot boundary, and is therefore segmented into two actual repetitions (Rep #2 and Rep #3). The UE then transmits the next two nominal PUSCH repetitions (Rep #4 and Rep #5) that do not cross a slot boundary, do not collide with downlink or invalid symbols, and do not overlap with the idle period in the FFP associated with the base station. However, a next nominal repetition overlaps with the idle period in the FFP associated with the base station. Accordingly, as shown by reference number 710, the UE segments the nominal PUSCH repetition that overlaps with the idle period in the FFP associated with the base station into an actual PUSCH repetition (Rep #6) that does not overlap with the idle period. The UE may therefore transmit the actual repetition that does not overlap with the idle period, and may otherwise refrain from transmitting during the symbols that coincide with the idle period in the FFP associated with the base station.

Furthermore, in example 700, the UE is configured to transmit additional PUSCH repetitions having Type B in a next FFP associated with the base station. Accordingly, as shown by reference number 712, the UE may resume transmission of the PUSCH repetitions in the next FFP based at least in part on detecting downlink activity during a channel occupancy time of the FFP. For example, in FIG. 7, the gap between the downlink and uplink transmission burst may exceed 16 μs, whereby the UE may perform a Cat-2 LBT procedure just prior to a PUSCH repetition (Repetition #1), and resume transmitting the PUSCH repetitions if the Cat-2 LBT procedure passes. If the Cat-2 LBT procedure fails, the UE may attempt another Cat-2 LBT procedure just prior to a next PUSCH repetition. Accordingly, in cases the Cat-2 LBT procedure fails, the UE may continue to attempt the Cat-2 LBT procedure during subsequent candidate LBT positions that occur just prior to a nominal or actual PUSCH repetition having Type B. Alternatively, the UE may resume transmitting the PUSCH repetitions without performing an LBT procedure if downlink activity is detected and the gap between the downlink and uplink transmission burst does not exceed 16 μs.

As indicated above, FIG. 7 is provided as an example. Other examples may differ from what is described with regard to FIG. 7.

FIGS. 8A-8D are diagrams illustrating examples 800, 820, 840, 860 associated with PUSCH repetition handling in an FBE mode idle period, in accordance with various aspects of the present disclosure. As shown in FIGS. 8A-8D, examples 800, 820, 840, 860 include a base station that may communicate with a UE in a wireless network. As described herein, the base station and the UE communicate on an uplink and a downlink using one or more unlicensed channels in FBE mode. Furthermore, in examples 800, 820, 840, 860, the base station may initiate an LBT procedure to acquire a channel occupancy time in FBE mode, and the UE may share the channel occupancy time acquired by the base station in cases where the UE detects one or more downlink transmissions from the base station. In addition, the UE may be allowed to initiate an LBT procedure to acquire a channel occupancy time in FBE mode. Accordingly, in examples 800, 820, 840, 860, a first FFP (e.g., a "base station FFP") may be configured for the base station, and a second FFP (e.g., a "UE FFP") may be configured for the UE. The base station FFP and the UE FFP may each include an idle period, and the UE may be configured to transmit one or more PUSCH repetitions having Type A. Accordingly, in cases where one or more of the PUSCH repetitions having Type A at least partially overlap with the idle period in the base station FFP and/or the UE FFP, the UE may determine how to handle (e.g., whether to transmit or drop) the PUSCH repetition(s).

Figure 8A:
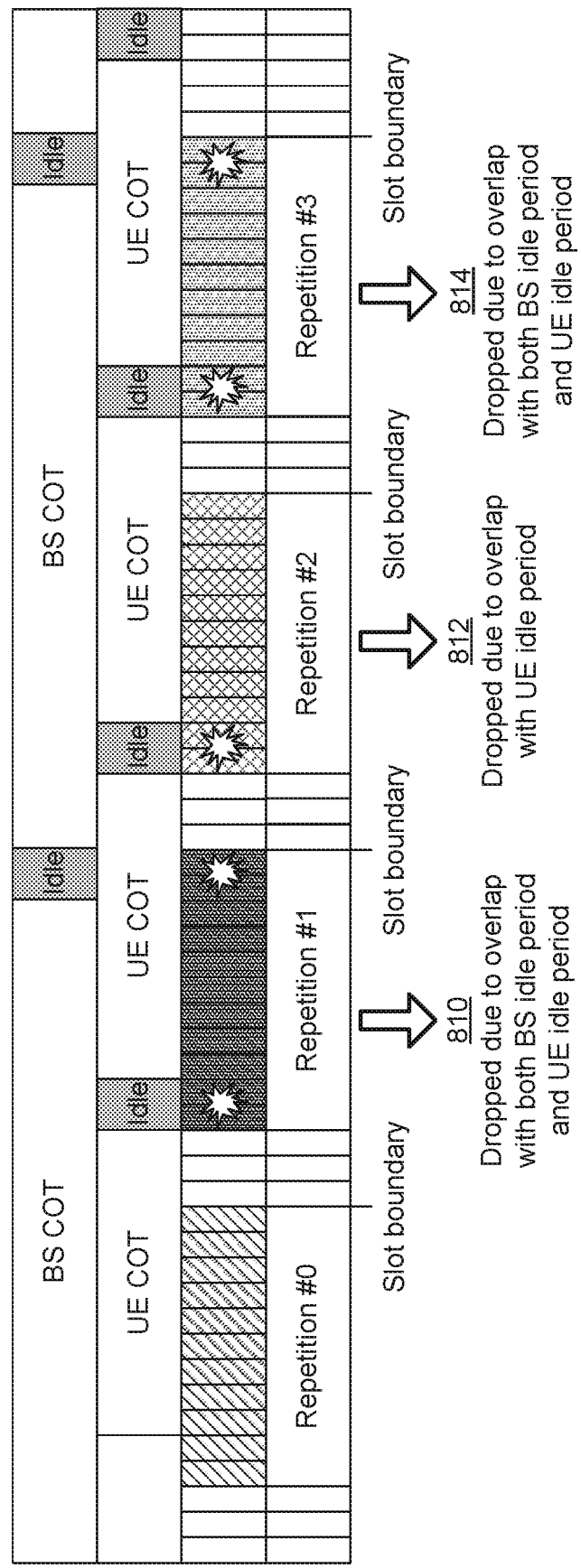

For example, the UE may be configured to transmit one or more PUSCH repetitions, that are associated with a Type A configuration, that do not overlap with the idle period in the base station FFP or the UE FFP, and the UE may drop any PUSCH repetitions that overlap with the idle period in either the base station FFP or the UE FFP. In this case, the UE may refrain from transmitting a PUSCH repetition having Type A in cases where the PUSCH repetition overlaps with the idle period in the base station FFP or the UE FFP, regardless of whether the corresponding node acquires a channel occupancy time. In this way, other devices (e.g., LBE devices) may have an opportunity to perform a Cat-4 LBT procedure during the idle period of the base station FFP and the UE FFP in order to acquire access to the unlicensed channel(s). For example, as shown in FIG. 8A, the UE may be configured to transmit four PUSCH repetitions having Type A across four consecutive slots, with each PUSCH repetition covering 11 symbols and each PUSCH repetition starting from the fourth symbol in a slot. In this case, the UE transmits a first PUSCH repetition (Repetition #0) that does not overlap with the idle period in the base station FFP or the UE FFP. However, a second PUSCH repetition (Repetition #1) overlaps with the idle period in the base station FFP and the UE FFP. Accordingly, as shown by reference number 810, the UE refrains from transmitting the second PUSCH repetition due to the overlap with the idle period in the base station FFP and the UE FFP. Furthermore, as shown by reference number 812, the UE refrains from transmitting the third PUSCH repetition (Repetition #2) due to an overlap with the idle period in the UE FFP, and as shown by reference number 814, the UE refrains from transmitting the fourth PUSCH repetition (Repetition #3) due to an overlap with the idle period in the UE FFP and the base station FFP.

Figure 8B:
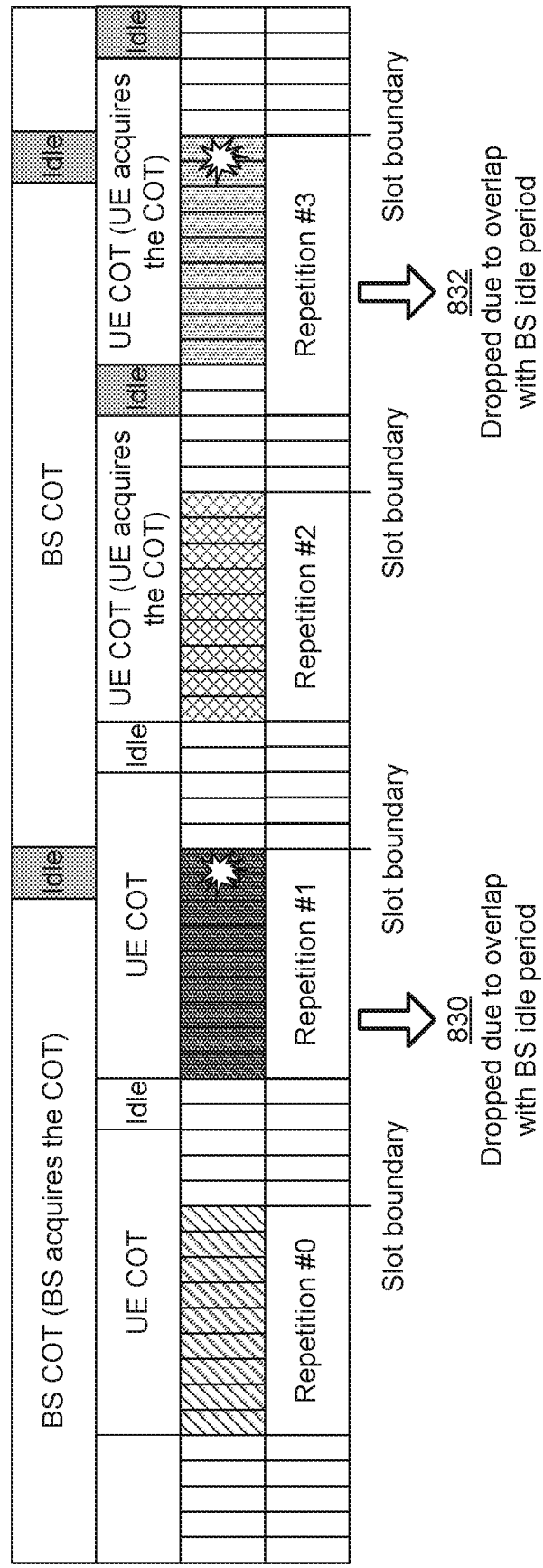

Alternatively, in cases where both a base station FFP and a UE FFP are configured and the UE is configured to transmit PUSCH repetitions having Type A, the UE may always drop PUSCH repetitions that overlap with the idle period in the base station FFP regardless of whether the base station acquires a channel occupancy time, and may drop PUSCH repetitions that overlap with the idle period in the UE FFP only in cases where the UE acquires a channel occupancy time. In this way, always dropping the PUSCH repetitions that overlap with the idle period in the base station FFP may provide a guaranteed idle period in the base station FFP, during which other devices (e.g., LBE devices) may have an opportunity to contend for access to the unlicensed channel(s) (e.g., in case the UE fails to detect downlink activity from the base station and incorrectly determines that the base station has not acquired a channel occupancy time). For example, as shown in FIG. 8B, and by reference number 830, the UE may refrain from transmitting a second PUSCH repetition having Type A (Repetition #1) due to an overlap with the idle period in the base station FFP. Similarly, as shown by reference number 832, the UE may refrain from transmitting a fourth PUSCH repetition (Repetition #3) due to an overlap with the idle period in the base station FFP even though the base station has not acquired a channel occupancy time. Although not specifically shown in FIG. 8B, the UE would transmit a PUSCH repetition that overlaps with the idle period in the UE FFP in cases where the PUSCH repetition does not overlap with the idle period in the base station FFP and the UE has not acquired a channel occupancy time.

Figure 8C:
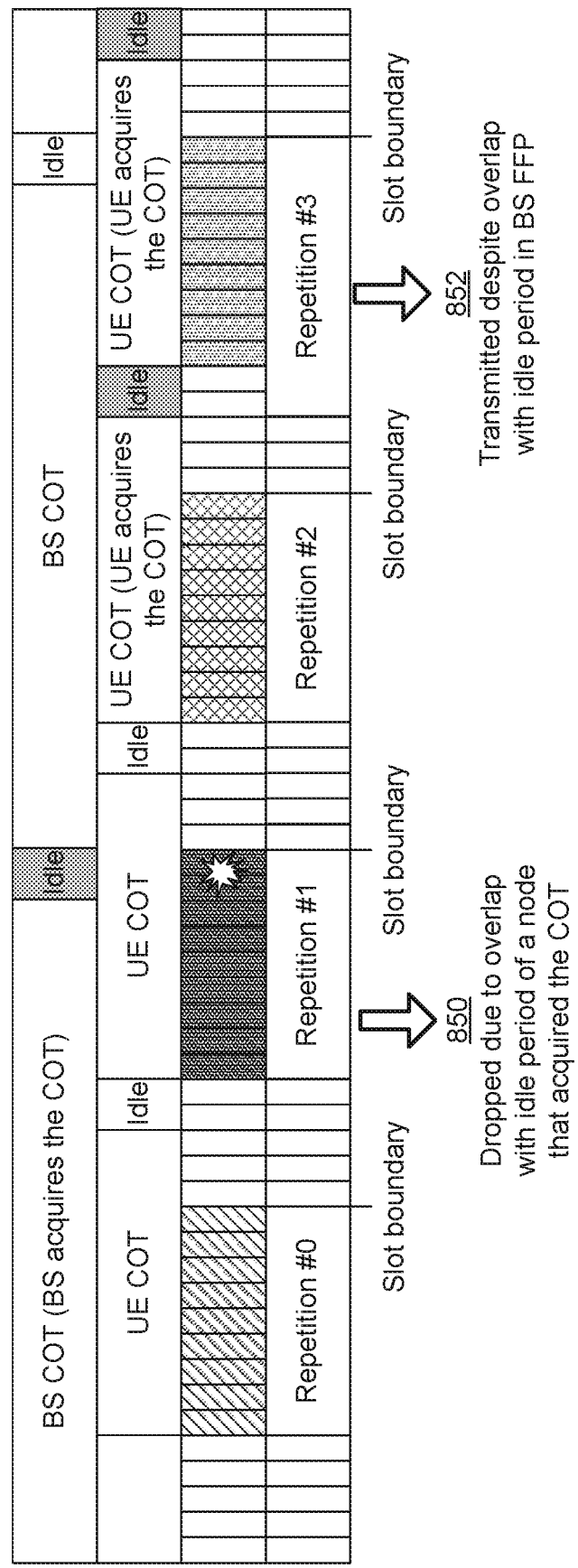

Alternatively, in cases where a PUSCH repetition having Type A overlaps with the idle period in an FFP associated with a node, the UE may refrain from transmitting the PUSCH repetition if the node acquires a channel occupancy time, and may otherwise transmit the PUSCH repetition if the node does not acquire the channel occupancy time. In other words, a PUSCH repetition that overlaps with the idle period in the base station FFP may be dropped only in cases where the base station acquires a channel occupancy time, and a PUSCH repetition that overlaps with the idle period in the UE FFP may be dropped only in cases where the UE acquires a channel occupancy time. For example, as shown in FIG. 8C, the base station may acquire a channel occupancy time in a first FFP associated with the base station, and may not acquire a channel occupancy time in a second FFP associated with the base station. Accordingly, as shown by reference number 850, the UE may refrain from transmitting a PUSCH repetition that overlaps with the idle period in the first base station FFP (Repetition #1) because the base station has acquired a channel occupancy time. However, as shown by reference number 852, the UE may transmit a PUSCH repetition (Repetition #3) despite an overlap with the idle period in the base station FFP because the base station does not acquire a channel occupancy time in the second base station FFP. Furthermore, as shown in FIG. 8C, the UE does not acquire a channel occupancy time in a first UE FFP or a second UE FFP, and does acquire a channel occupancy time in a third UE FFP and a fourth UE FFP. Accordingly, if a PUSCH repetition were to overlap with the idle period in the first UE FFP or a second UE FFP, the UE would be permitted to transmit the PUSCH repetition despite the overlap with the idle period because the UE did not acquire a channel occupancy time. However, if a PUSCH repetition were to overlap with the idle period in the third UE FFP or the fourth UE FFP, the UE would refrain from transmitting the PUSCH repetition due to the overlap with the idle period because the UE acquired a channel occupancy time.

Figure 8D:
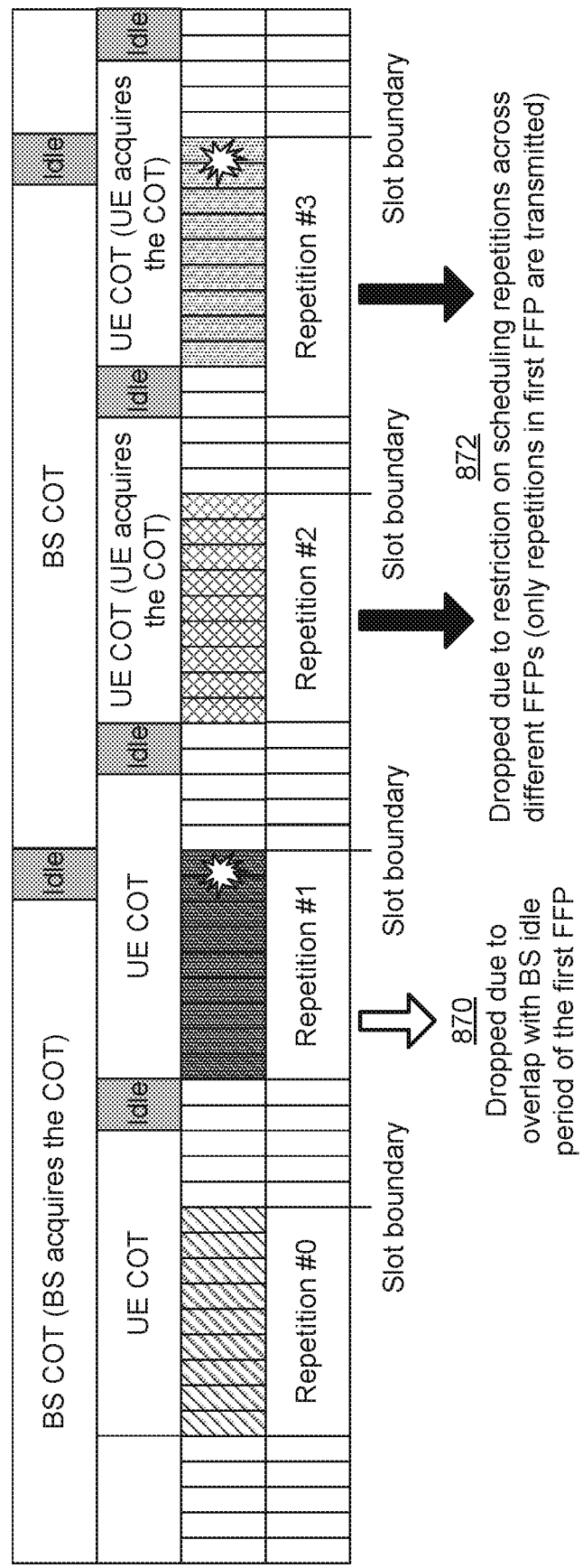

Additionally, or alternatively, when the UE is configured to transmit multiple PUSCH repetitions having Type A across different FFPs, the UE may be restricted to only transmit PUSCH repetitions in a first FFP. Furthermore, in such cases, the UE may drop a PUSCH repetition that overlaps with the idle period in the first FFP based at least in part on one or more of the techniques described above with reference to FIGS. 8A-8C. For example, as shown in FIG. 8D, and by reference number 870, the UE may drop a second PUSCH repetition (Repetition #1) that is scheduled in a first base station FFP due to an overlap with the idle period following a channel occupancy time that the base station acquired in the first base station FFP. Furthermore, as shown by reference number 872, PUSCH repetitions in a next FFP (e.g., a next base station FFP) are dropped due to the restriction on scheduling multiple PUSCH repetitions across different FFPs.

As indicated above, FIGS. 8A-8D are provided as an example. Other examples may differ from what is described with regard to FIGS. 8A-8D.

FIGS. 9A-9D are diagrams illustrating examples 900, 920, 940, 960 associated with PUSCH repetition handling in an FBE mode idle period, in accordance with various aspects of the present disclosure. As shown in FIGS. 9A-9D, examples 900, 920, 940, 960 include a base station that may communicate with a UE in a wireless network. As described herein, the base station and the UE communicate on an uplink and a downlink using one or more unlicensed channels in FBE mode. Furthermore, in examples 900, 920, 940, 960, the base station may initiate an LBT procedure to acquire a channel occupancy time in FBE mode, and the UE may share the channel occupancy time acquired by the base station in cases where the UE detects one or more downlink transmissions from the base station. In addition, the UE may be allowed to initiate an LBT procedure to acquire a channel occupancy time in FBE mode. Accordingly, in examples 900, 920, 940, 960, a first FFP (e.g., a "base station FFP") may be configured for the base station, and a second FFP (e.g., a "UE FFP") may be configured for the UE. The base station FFP and the UE FFP may each include an idle period, and the UE may be configured to transmit one or more nominal PUSCH repetitions having Type B. Accordingly, in cases where a nominal PUSCH repetition at least partially overlaps with the idle period in the base station FFP and/or the UE FFP, the UE may determine how to handle (e.g., whether to transmit, segment, or drop) the nominal PUSCH repetition.

For example, the UE may be configured to transmit one or more nominal PUSCH repetitions that do not overlap with the idle period in the base station FFP or the UE FFP, and the UE may segment any nominal PUSCH repetitions that overlap with the idle period in either the base station FFP or the UE FFP. For example, the UE may segment the nominal PUSCH repetition around the idle period in the base station FFP if the nominal PUSCH repetition overlaps with the idle period in the base station FFP, may segment the nominal PUSCH repetition around the idle period in the UE FFP if the nominal PUSCH repetition overlaps with the idle period in the UE FFP, or may segment the nominal PUSCH repetition around idle periods in both the base station FFP and the UE FFP if the nominal PUSCH repetition overlaps with both idle periods. In this case, the UE may segment the nominal PUSCH repetition into one or more actual repetitions, and may only transmit actual repetitions that do not overlap with the idle period in either FFP. In other words, the UE may refrain from transmitting a PUSCH repetition having Type B during symbols that coincide with the idle period in the base station FFP and symbols that coincide with the idle period in the UE FFP.

Figure 9A:
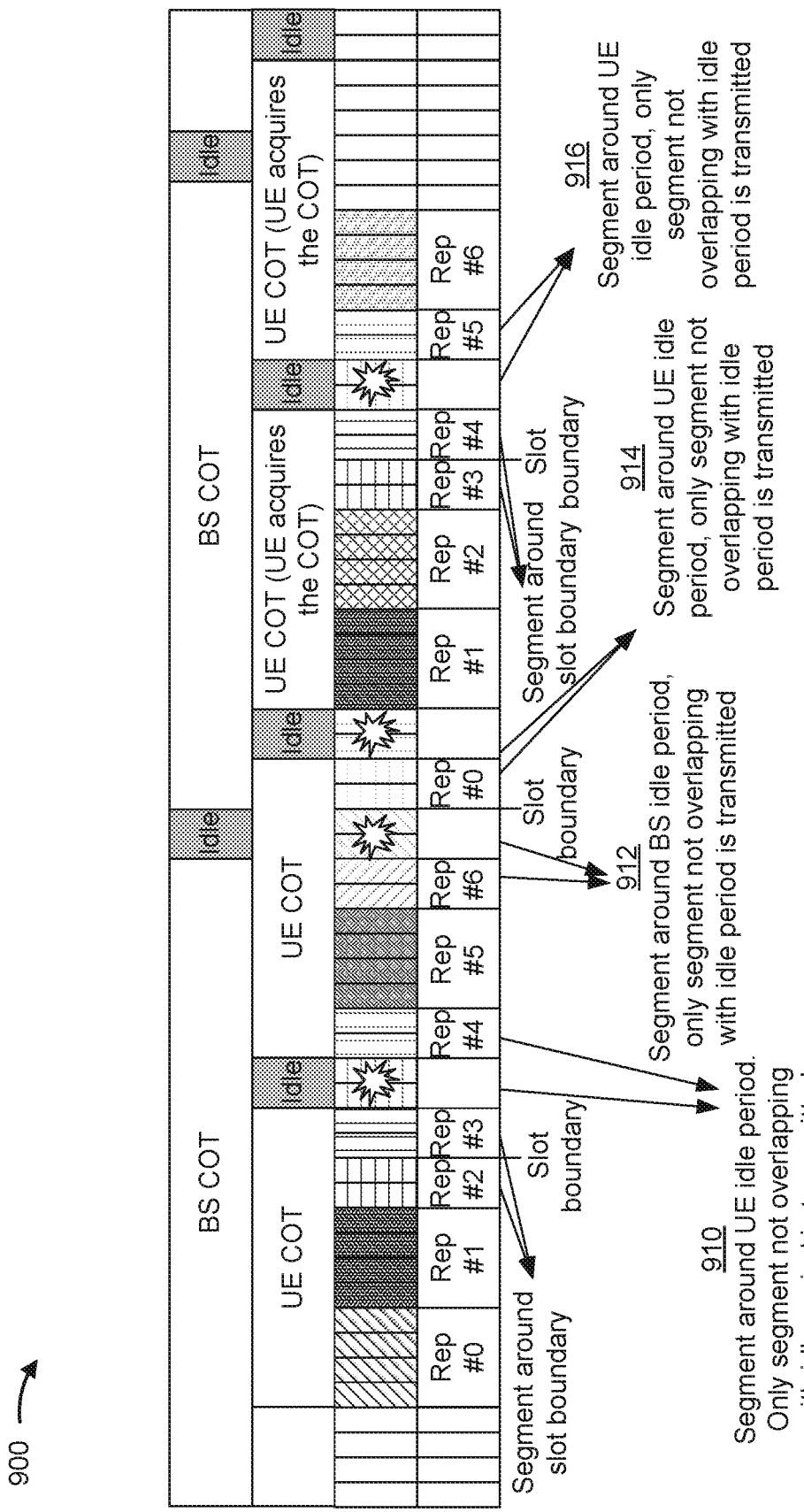

For example, as shown in FIG. 9A, and by reference number 910, the UE may segment a nominal PUSCH repetition that overlaps with the idle period in a first UE FFP. The nominal PUSCH repetition may have a nominal length of four symbols, and may be segmented into an actual repetition (Rep #3) that occupies two symbols that do not overlap with the idle period in the UE FFP. Accordingly, the UE may transmit the actual repetition, and may refrain from transmitting during the next two symbols that coincide with the idle period in the UE FFP. Similarly, as shown by reference numbers 912, 914, and 916, the UE may segment a nominal PUSCH repetition that overlaps with the idle period in a first base station FFP, a nominal PUSCH repetition that overlaps with the idle period in a second UE FFP, and a nominal PUSCH repetition that overlaps with the idle period in a third UE FFP, and the UE may transmit only the segment(s) that do not overlap with the idle period in either the base station FFP or the UE FFP.

Figure 9B:
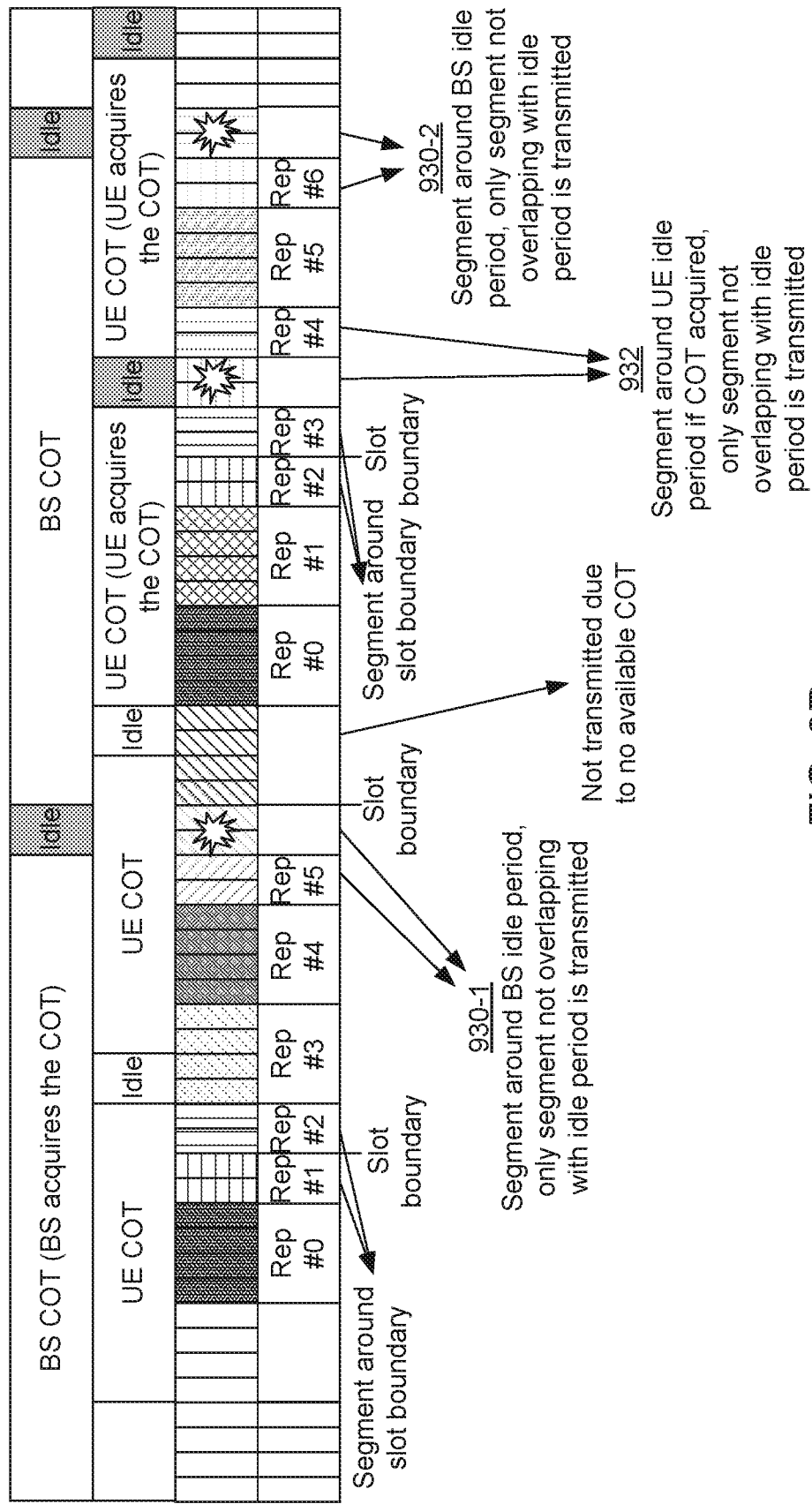

Alternatively, in cases where both a base station FFP and a UE FFP are configured and the UE is configured to transmit PUSCH repetitions having Type B, the UE may always segment PUSCH repetitions that overlap with the idle period in the base station FFP around the idle period in the base station FFP regardless of whether the base station acquires a channel occupancy time, and may segment PUSCH repetitions that overlap with the idle period in the UE FFP around the idle period in the UE FFP only in cases where the UE acquires a channel occupancy time. In this way, always segmenting the PUSCH repetitions that overlap with the idle period in the base station FFP may provide a guaranteed idle period in the base station FFP, providing other devices an opportunity to contend for access to the unlicensed channel(s) (e.g., in case the UE fails to detect downlink activity from the base station and incorrectly determines that the base station has not acquired a channel occupancy time). For example, as shown in FIG. 9B, and by reference numbers 930-1 and 930-2, the UE may segment nominal (Type B) PUSCH repetitions that overlap with the idle period in a base station FFP regardless of whether the base station acquires a channel occupancy time. However, the UE does not segment nominal PUSCH repetitions that overlap with the idle period in the UE FFP if the UE does not acquire a channel occupancy time. For example, in FIG. 9B, the UE does not segment a third nominal PUSCH repetition (Rep #3) that overlaps with the idle period in a first UE FFP because the UE did not acquire a channel occupancy time. As further shown by reference number 932, the UE does segment a nominal PUSCH repetition that overlaps with the idle period in a third UE FFP around the idle period because the UE acquires a channel occupancy time in the third UE FFP.

Figure 9C:
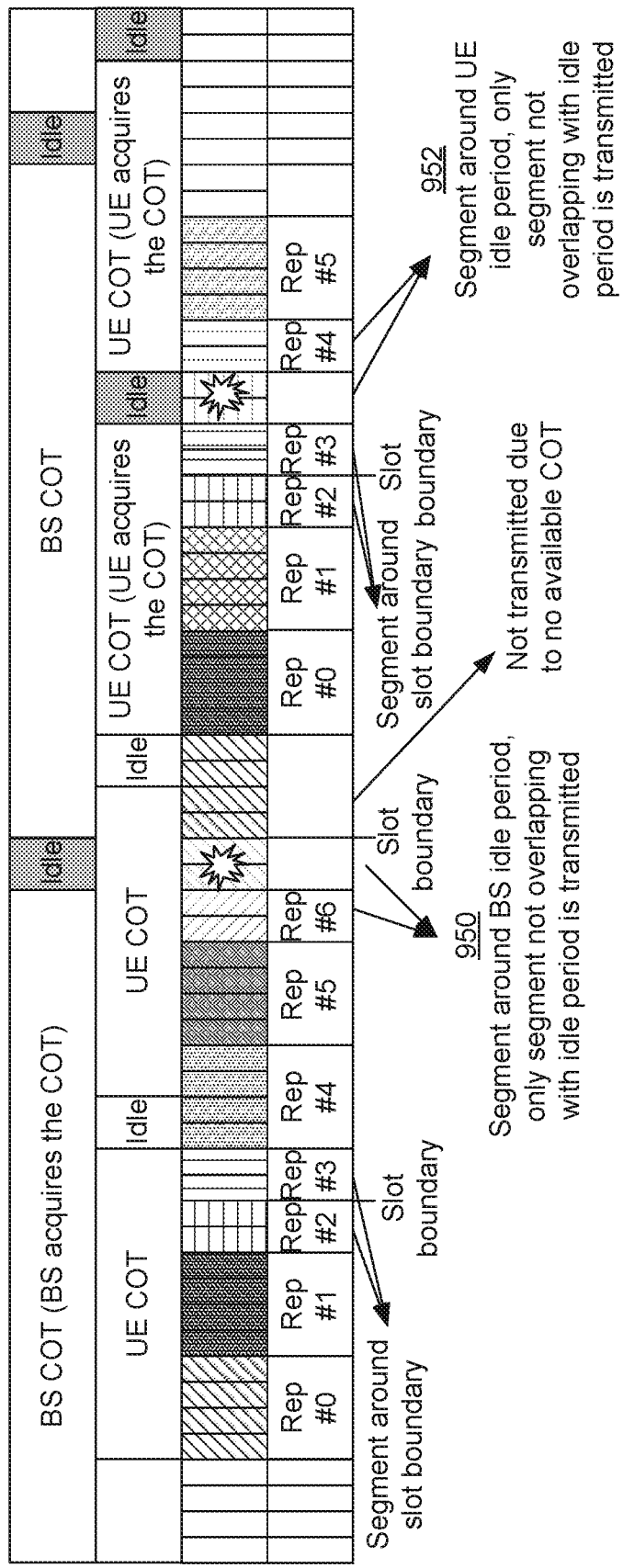

Alternatively, in cases where a nominal PUSCH repetition having Type B overlaps with the idle period in an FFP associated with a node, the UE may segment the nominal PUSCH repetition around the idle period and only transmit a segment that does not overlap with the idle period if the node acquires a channel occupancy time. Otherwise, the UE may refrain from segmenting a nominal PUSCH repetition that overlaps with the idle period in an FFP associated with a node if the node does not acquire a channel occupancy time. In other words, the UE may segment a nominal PUSCH repetition that overlaps with the idle period in the base station FFP around the idle period in the base station FFP only in cases where the base station acquires a channel occupancy time. Similarly, the UE may segment a nominal PUSCH repetition that overlaps with the idle period in the UE FFP around the idle period in the UE FFP only in cases where the UE acquires a channel occupancy time. For example, as shown in FIG. 9C, the base station may acquire a channel occupancy time in a first base station FFP, and may not acquire a channel occupancy time in a second base station FFP. Accordingly, as shown by reference number 950, the UE may segment a nominal PUSCH repetition that overlaps with the idle period in the first base station FFP and only transmit a segment that does not overlap with the idle period in the first base station FFP because the base station has acquired a channel occupancy time in the first base station FFP. Furthermore, as shown in FIG. 9C, the UE does not acquire a channel occupancy time in a first UE FFP or a second UE FFP, and does acquire a channel occupancy time in a third UE FFP and a fourth UE FFP. Accordingly, as shown by reference number 952, the UE may segment a nominal PUSCH repetition that overlaps with the idle period in the third UE FFP and only transmit a segment that does not overlap with the idle period in the third UE FFP because the UE has acquired a channel occupancy time in the third UE FFP. Furthermore, the UE may transmit one or more nominal PUSCH repetitions that overlap with the idle period in the first UE FFP or the second UE FFP without segmentation (e.g., Rep #4) because the UE does not acquire a channel occupancy time in the first or second UE FFP.

Figure 9D:
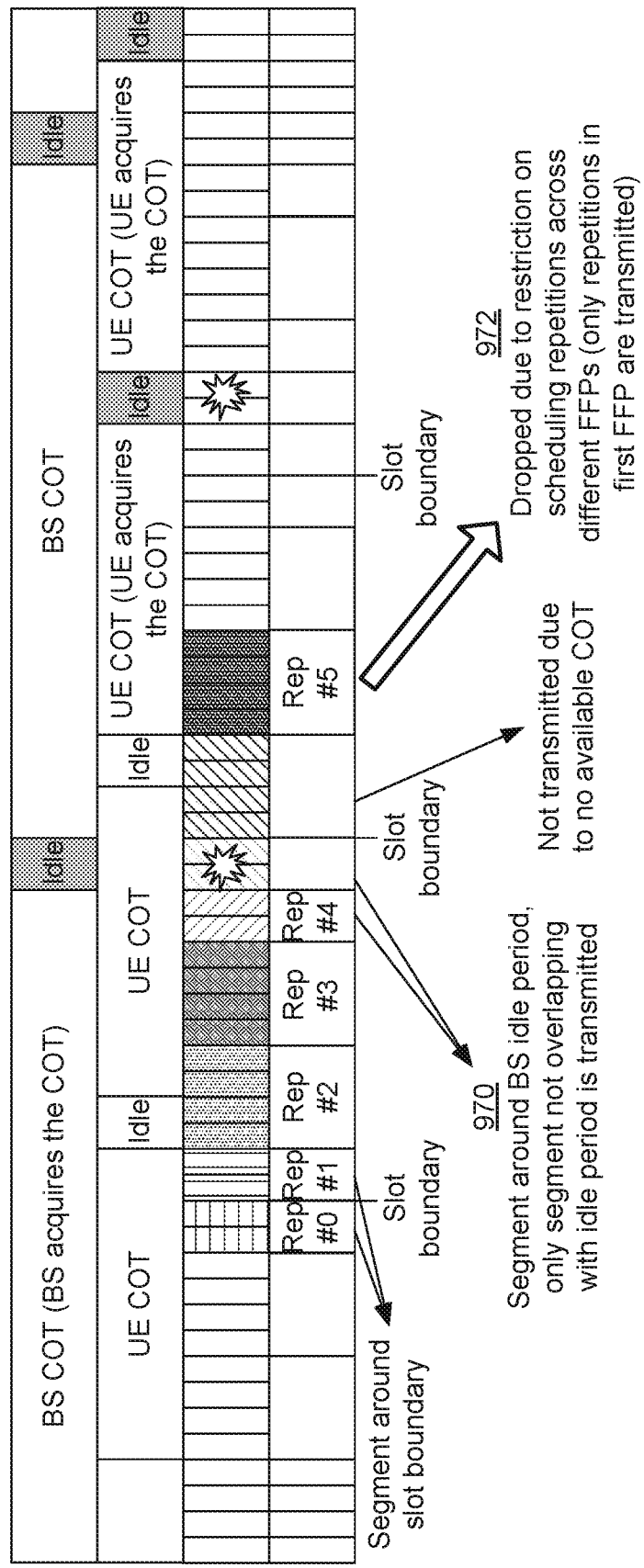

Additionally, or alternatively, when the UE is configured to transmit multiple PUSCH repetitions having Type B across different FFPs, the UE may be restricted to only transmit PUSCH repetitions in a first FFP. Furthermore, in such cases, the UE may segment a PUSCH repetition that overlaps with an idle period in the first FFP based at least in part on one or more of the techniques described above with reference to FIGS. 9A-9C. For example, as shown in FIG. 9D, and by reference number 970, the UE may segment a nominal PUSCH repetition that overlaps with the idle period in a first base station FFP, and may transmit only an actual repetition (e.g., a segment of the nominal PUSCH repetition) that does not overlap with the idle period in the first base station FFP. Furthermore, as shown by reference number 972, nominal PUSCH repetitions in a next FFP (e.g., a next base station FFP) are dropped due to the restriction on scheduling multiple PUSCH repetitions across different FFPs.

As indicated above, FIGS. 9A-9D are provided as an example. Other examples may differ from what is described with regard to FIGS. 9A-9D.

Figure 10:
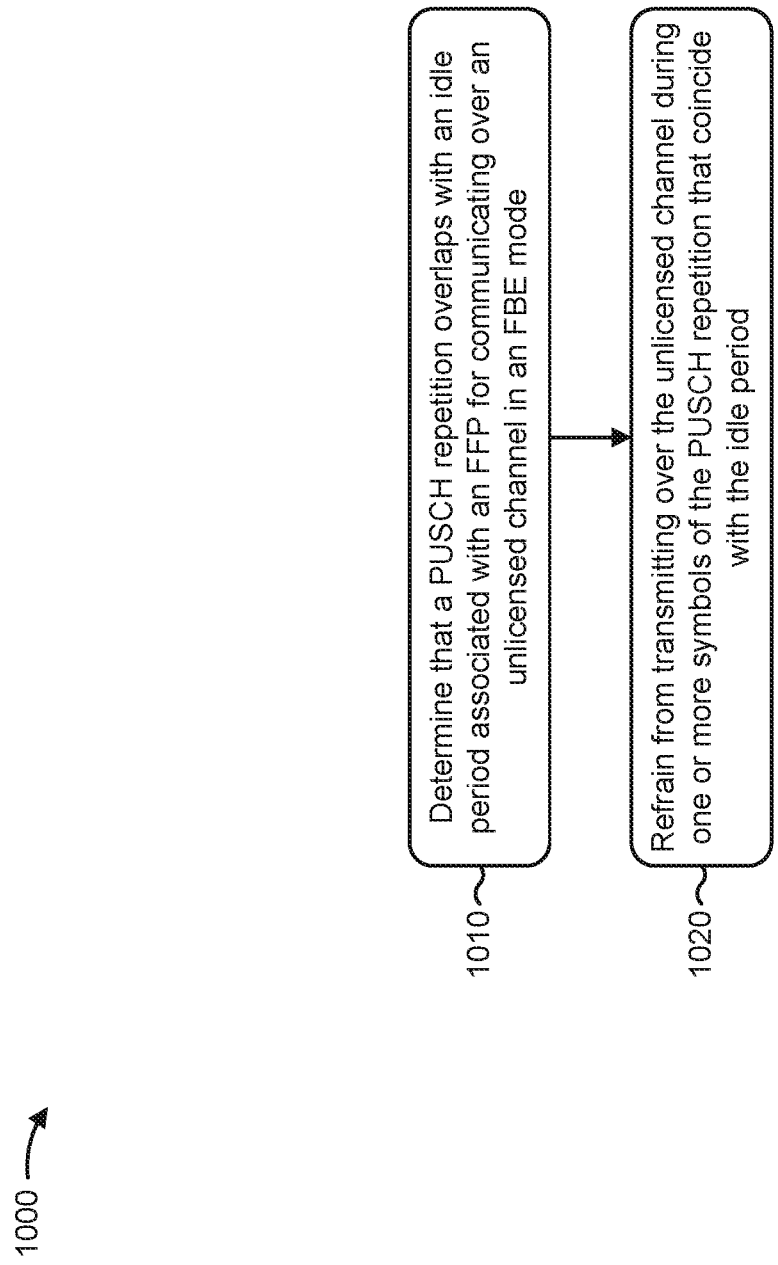
FIG. 10 is a diagram illustrating an example process associated with PUSCH repetition handling in an FBE mode idle period, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120) performs operations associated with PUSCH repetition handling in an FBE mode idle period.

As shown in FIG. 10, in some aspects, process 1000 may include determining that a PUSCH repetition overlaps with an idle period associated with an FFP for communicating over an unlicensed channel in an FBE mode (block 1010). For example, the UE (e.g., using determination component 1108, depicted in FIG. 11) may determine that a PUSCH repetition overlaps with an idle period associated with an FFP for communicating over an unlicensed channel in an FBE mode, as described above.

As further shown in FIG. 10, in some aspects, process 1000 may include refraining from transmitting over the unlicensed channel during one or more symbols of the PUSCH repetition that coincide with the idle period (block 1020). For example, the UE (e.g., using transmission component 1104, depicted in FIG. 11) may refrain from transmitting over the unlicensed channel during one or more symbols of the PUSCH repetition that coincide with the idle period, as described above.

Process 1000 may include additional aspects, such as any single aspect or any combination of aspects described below and/or in connection with one or more other processes described elsewhere herein.

In a first aspect, process 1000 includes refraining from transmitting over the unlicensed channel during one or more symbols of the PUSCH repetition that are outside the idle period based at least in part on determining that the PUSCH repetition is associated with a type A configuration.

In a second aspect, alone or in combination with the first aspect, refraining from transmitting over the unlicensed channel during the one or more symbols of the PUSCH repetition outside the idle period is further based at least in part on determining that the FFP is associated with a base station.

In a third aspect, alone or in combination with one or more of the first and second aspects, refraining from transmitting over the unlicensed channel during the one or more symbols of the PUSCH repetition outside the idle period is further based at least in part on determining that the FFP is associated with the UE and that the UE has acquired a channel occupancy time associated with the FFP.

In a fourth aspect, alone or in combination with one or more of the first through third aspects, refraining from transmitting over the unlicensed channel during the one or more symbols of the PUSCH repetition outside the idle period is further based at least in part on determining that a node associated with the FFP has acquired a channel occupancy time associated with the FFP.

In a fifth aspect, alone or in combination with one or more of the first through fourth aspects, process 1000 includes segmenting the PUSCH repetition into multiple actual repetitions, wherein the PUSCH repetition is segmented around the idle period based at least in part on determining that the PUSCH repetition is associated with a type B configuration, and process 1000 further includes transmitting one or more of the multiple actual repetitions that do not overlap with the idle period.

In a sixth aspect, alone or in combination with one or more of the first through fifth aspects, process 1000 includes refraining from transmitting one or more of the multiple actual repetitions that are outside the idle period and occupy a single symbol.

In a seventh aspect, alone or in combination with one or more of the first through sixth aspects, the PUSCH repetition is segmented around the idle period further based at least in part on determining that the FFP is associated with a base station.

In an eighth aspect, alone or in combination with one or more of the first through seventh aspects, the PUSCH repetition is segmented around the idle period further based at least in part on determining that the FFP is associated with the UE and that the UE has acquired a channel occupancy time associated with the FFP.

In a ninth aspect, alone or in combination with one or more of the first through eighth aspects, the PUSCH repetition is segmented around the idle period further based at least in part on determining that a node associated with the FFP has acquired a channel occupancy time associated with the FFP.

In a tenth aspect, alone or in combination with one or more of the first through ninth aspects, process 1000 includes transmitting, in a next FFP, a PUSCH repetition that does not overlap with the idle period based at least in part on detecting downlink activity in a channel occupancy time associated with the next FFP.

In an eleventh aspect, alone or in combination with one or more of the first through tenth aspects, the PUSCH repetition is transmitted further based at least in part on a starting symbol of the PUSCH repetition corresponding to a boundary of an actual repetition associated with a type B configuration.

In a twelfth aspect, alone or in combination with one or more of the first through eleventh aspects, process 1000 includes performing an LBT procedure in an interval before the PUSCH repetition that does not overlap with the idle period based at least in part on a gap between an uplink and downlink transmission burst satisfying a threshold.

In a thirteenth aspect, alone or in combination with one or more of the first through twelfth aspects, process 1000 includes refraining from transmitting one or more PUSCH repetitions that are scheduled in a next FFP.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
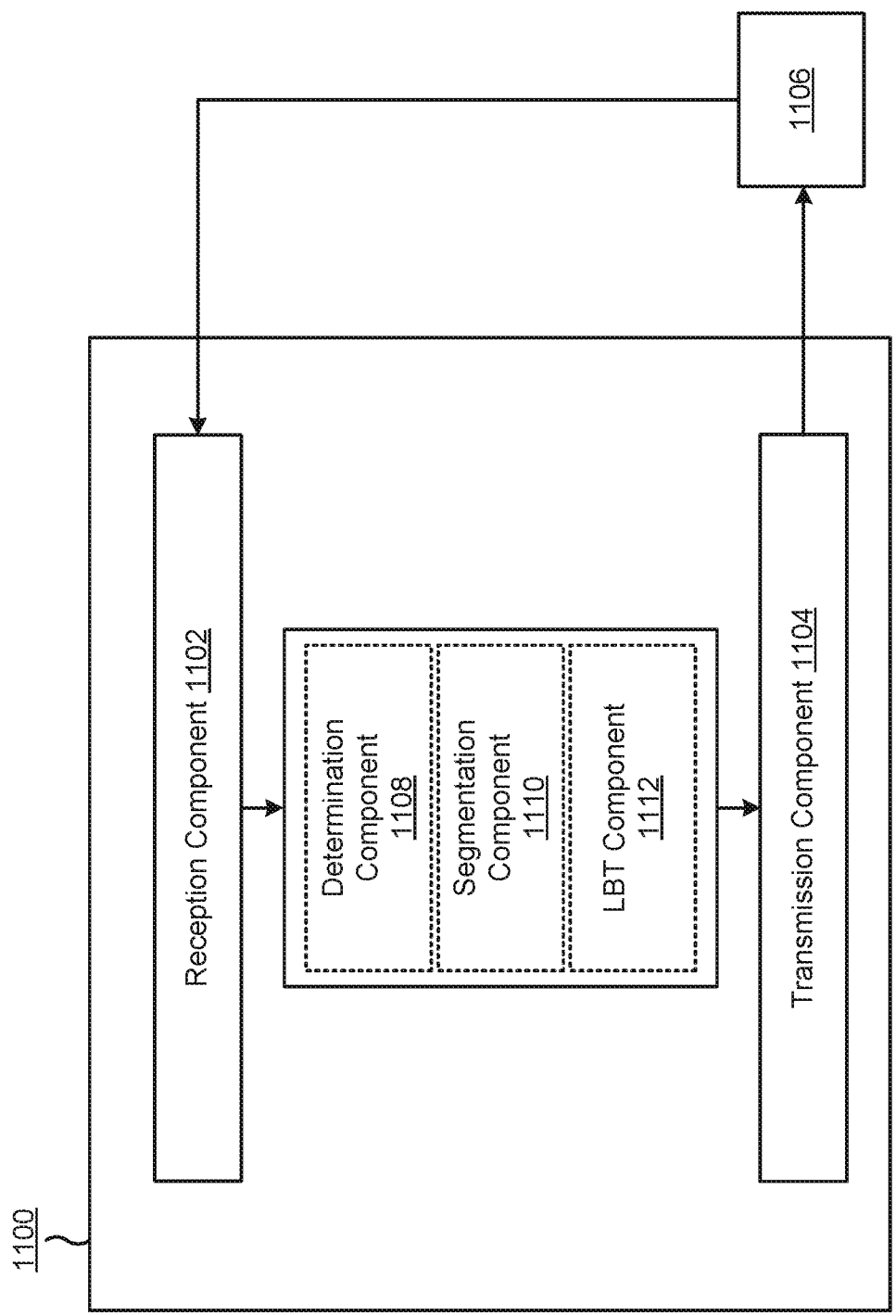
FIG. 11 is a block diagram of an example apparatus for wireless communication, in accordance with various aspects of the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108, a segmentation component 1110, or an LBT component 1112, among other examples.

In some aspects, the apparatus 1100 may be configured to perform one or more operations described herein in connection with FIG. 6, FIG. 7, FIGS. 8A-8D, and/or FIGS. 9A-9D. Additionally or alternatively, the apparatus 1100 may be configured to perform one or more processes described herein, such as process 1000 of FIG. 10. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The determination component 1108 may determine that a PUSCH repetition overlaps with an idle period associated with an FFP for communicating over an unlicensed channel in an FBE mode. In some aspects, the determination component 1108 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 1104 may refrain from transmitting over the unlicensed channel during one or more symbols of the PUSCH repetition that coincide with the idle period.

The transmission component 1104 may refrain from transmitting over the unlicensed channel during one or more symbols of the PUSCH repetition that are outside the idle period based at least in part on determining that the PUSCH repetition is associated with a type A configuration.

The segmentation component 1110 may segment the PUSCH repetition into multiple actual repetitions around the idle period based at least in part on determining that the PUSCH repetition is associated with a type B configuration. In some aspects, the segmentation component 1110 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 1104 may transmit one or more of the multiple actual repetitions that do not overlap with the idle period.

The transmission component 1104 may refrain from transmitting one or more of the multiple actual repetitions that are outside the idle period and occupy a single symbol.

The transmission component 1104 may transmit, in a next FFP, a PUSCH repetition that does not overlap with the idle period based at least in part on detecting downlink activity in a channel occupancy time associated with the next FFP.

The LBT component 1112 may perform an LBT procedure in an interval before the PUSCH repetition that does not overlap with the idle period based at least in part on a gap between an uplink and downlink transmission burst satisfying a threshold. In some aspects, the LBT component 1112 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 1104 may refrain from transmitting one or more PUSCH repetitions that are scheduled in a next FFP.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
determining that a physical uplink shared channel (PUSCH) repetition overlaps with an idle period associated with a fixed frame period (FFP) for communicating over an unlicensed channel in a frame based equipment (FBE) mode;
refraining from transmitting over the unlicensed channel during one or more symbols of the PUSCH repetition that coincide with the idle period;
determining whether the idle period is associated with a first fixed frame period (FFP) associated with a base station or a second FFP associated with the UE; and
segmenting the PUSCH repetition into multiple actual repetitions, wherein the PUSCH repetition is segmented around the idle period based at least in part on one or more of:
determining that the idle period is associated with the first FFP; or
determining that the idle period is associated with the second FFP and that the UE has acquired a channel occupancy time associated with the second FFP.

2. The method of claim 1, further comprising:
refraining from transmitting over the unlicensed channel during one or more symbols of the PUSCH repetition that are outside the idle period based at least in part on determining that the PUSCH repetition is associated with a type A configuration.

3. The method of claim 2, wherein refraining from transmitting over the unlicensed channel during the one or more symbols of the PUSCH repetition outside the idle period is further based at least in part on determining that the FFP is associated with a base station.

4. The method of claim 2, wherein refraining from transmitting over the unlicensed channel during the one or more symbols of the PUSCH repetition outside the idle period is further based at least in part on determining that the FFP is associated with the UE and that the UE has acquired a channel occupancy time associated with the FFP.

5. The method of claim 2, wherein refraining from transmitting over the unlicensed channel during the one or more symbols of the PUSCH repetition outside the idle period is further based at least in part on determining that a node associated with the FFP has acquired a channel occupancy time associated with the FFP.

6. The method of claim 1,
wherein the PUSCH repetition is segmented around the idle period based at least in part on determining that the PUSCH repetition is associated with a type B configuration; and
the method further comprising transmitting one or more of the multiple actual repetitions that do not overlap with the idle period.

7. The method of claim 6, further comprising:
refraining from transmitting one or more of the multiple actual repetitions that are outside the idle period and occupy a single symbol.

8. The method of claim 6, wherein the PUSCH repetition is segmented around the idle period further based at least in part on determining that a node associated with the FFP has acquired a channel occupancy time associated with the FFP.

9. The method of claim 1, further comprising:
transmitting, in a next FFP, a PUSCH repetition that does not overlap with the idle period based at least in part on detecting downlink activity in a channel occupancy time associated with the next FFP.

10. The method of claim 9, wherein the PUSCH repetition is transmitted further based at least in part on a starting symbol of the PUSCH repetition corresponding to a boundary of an actual repetition associated with a type B configuration.

11. The method of claim 9, further comprising:
performing a listen-before-talk procedure in an interval before the PUSCH repetition that does not overlap with the idle period based at least in part on a gap between an uplink and downlink transmission burst satisfying a threshold.

12. The method of claim 1, further comprising:
refraining from transmitting one or more PUSCH repetitions that are scheduled in a next FFP.

13. A user equipment (UE) for wireless communication, comprising:
one or more memories; and
one or more processors operatively coupled to the one or more memories, the one or more memories and the one or more processors configured to:
determine that a physical uplink shared channel (PUSCH) repetition overlaps with an idle period associated with a fixed frame period (FFP) for communicating over an unlicensed channel in a frame based equipment (FBE) mode;
refrain from transmitting over the unlicensed channel during one or more symbols of the PUSCH repetition that coincide with the idle period;
determine whether the idle period is associated with a first fixed frame period (FFP) associated with a base station or a second FFP associated with the UE; and
segment the PUSCH repetition into multiple actual repetitions, wherein the PUSCH repetition is segmented around the idle period based at least in part on one or more of:
a determination that the idle period is associated with the first FFP; or
a determination that the idle period is associated with the second FFP and that the UE has acquired a channel occupancy time associated with the second FFP.

14. The UE of claim 13, wherein the one or more processors are further configured to:
refrain from transmitting over the unlicensed channel during one or more symbols of the PUSCH repetition that are outside the idle period based at least in part on determining that the PUSCH repetition is associated with a type A configuration.

15. The UE of claim 14, wherein refraining from transmitting over the unlicensed channel during the one or more symbols of the PUSCH repetition outside the idle period is further based at least in part on determining that the FFP is associated with a base station.

16. The UE of claim 14, wherein refraining from transmitting over the unlicensed channel during the one or more symbols of the PUSCH repetition outside the idle period is further based at least in part on determining that the FFP is associated with the UE and that the UE has acquired a channel occupancy time associated with the FFP.

17. The UE of claim 14, wherein refraining from transmitting over the unlicensed channel during the one or more symbols of the PUSCH repetition outside the idle period is further based at least in part on determining that a node associated with the FFP has acquired a channel occupancy time associated with the FFP.

18. The UE of claim 13,
wherein the PUSCH repetition is segmented around the idle period based at least in part on determining that the PUSCH repetition is associated with a type B configuration; and
the one or more processors are further configured to transmit one or more of the multiple actual repetitions that do not overlap with the idle period.

19. The UE of claim 18, wherein the one or more processors are further configured to:
refrain from transmitting one or more of the multiple actual repetitions that are outside the idle period and occupy a single symbol.

20. The UE of claim 18, wherein the PUSCH repetition is segmented around the idle period further based at least in part on determining that a node associated with the FFP has acquired a channel occupancy time associated with the FFP.

21. The UE of claim 13, wherein the one or more processors are further configured to:
transmit, in a next FFP, a PUSCH repetition that does not overlap with the idle period based at least in part on detecting downlink activity in a channel occupancy time associated with the next FFP.

22. The UE of claim 21, wherein the PUSCH repetition is transmitted further based at least in part on a starting symbol of the PUSCH repetition corresponding to a boundary of an actual repetition associated with a type B configuration.

23. The UE of claim 21, wherein the one or more processors are further configured to:
perform a listen-before-talk procedure in an interval before the PUSCH repetition that does not overlap with the idle period based at least in part on a gap between an uplink and downlink transmission burst satisfying a threshold.

24. The UE of claim 13, wherein the one or more processors are further configured to:
refrain from transmitting one or more PUSCH repetitions that are scheduled in a next FFP.

25. A non-transitory computer-readable medium storing a set of instructions for wireless communication, the set of instructions comprising:
one or more instructions that, when executed by one or more processors of a user equipment (UE), cause the UE to:
determine that a physical uplink shared channel (PUSCH) repetition overlaps with an idle period associated with a fixed frame period (FFP) for communicating over an unlicensed channel in a frame based equipment (FBE) mode;
refrain from transmitting over the unlicensed channel during one or more symbols of the PUSCH repetition that coincide with the idle period;
determine whether the idle period is associated with a first fixed frame period (FFP) associated with a base station or a second FFP associated with the UE; and
segment the PUSCH repetition into multiple actual repetitions, wherein the PUSCH repetition is segmented around the idle period based at least in part on one or more of:
a determination that the idle period is associated with the first FFP; or
a determination that the idle period is associated with the second FFP and that the UE has acquired a channel occupancy time associated with the second FFP.

26. The non-transitory computer-readable medium of claim 25,
wherein the PUSCH repetition is segmented around the idle period based at least in part on determining that the PUSCH repetition is associated with a type B configuration; and
the set of instructions further cause the UE to transmit one or more of the multiple actual repetitions that do not overlap with the idle period.

27. The non-transitory computer-readable medium of claim 26, wherein the set of instructions further cause the UE to:
refrain from transmitting one or more of the multiple actual repetitions that are outside the idle period and occupy a single symbol.

28. An apparatus for wireless communication, comprising:
means for determining that a physical uplink shared channel (PUSCH) repetition overlaps with an idle period associated with a fixed frame period (FFP) for communicating over an unlicensed channel in a frame based equipment (FBE) mode;
means for refraining from transmitting over the unlicensed channel during one or more symbols of the PUSCH repetition that coincide with the idle period;
means for determining whether the idle period is associated with a first fixed frame period (FFP) associated with a base station or a second FFP associated with the UE; and
means for segmenting the PUSCH repetition into multiple actual repetitions, wherein the PUSCH repetition is segmented around the idle period based at least in part on one or more of:
a determination that the idle period is associated with the first FFP; or
a determination that the idle period is associated with the second FFP and that the UE has acquired a channel occupancy time associated with the second FFP.

29. The apparatus of claim 28,
wherein the PUSCH repetition is segmented around the idle period based at least in part on determining that the PUSCH repetition is associated with a type B configuration; and
the apparatus further comprises means for transmitting one or more of the multiple actual repetitions that do not overlap with the idle period.

30. The apparatus of claim 29, further comprising:
means for refraining from transmitting one or more of the multiple actual repetitions that are outside the idle period and occupy a single symbol.

\* \* \* \* \*